(12) United States Patent
van Datta et al.

(10) Patent No.: US 9,129,301 B2
(45) Date of Patent: *Sep. 8, 2015

(54) DISPLAY OF USER SELECTED ADVERTISING CONTENT IN A DIGITAL ENVIRONMENT

(75) Inventors: Glen van Datta, San Diego, CA (US); Marty Poulin, San Diego, CA (US)

(73) Assignee: Sony Computer Entertainment America LLC, San Mateo, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/452,848

(22) Filed: Jun. 13, 2006

(65) Prior Publication Data

US 2007/0079326 A1 Apr. 5, 2007

Related U.S. Application Data

(63) Continuation-in-part of application No. 11/241,229, filed on Sep. 30, 2005.

(51) Int. Cl.
*G06Q 30/02* (2012.01)
*A63F 13/30* (2014.01)
(Continued)

(52) U.S. Cl.
CPC ............ *G06Q 30/0251* (2013.01); *A63F 13/12* (2013.01); *G06Q 30/02* (2013.01); *G06Q 30/0244* (2013.01); *G06Q 30/0246* (2013.01); *G06Q 30/0273* (2013.01);
(Continued)

(58) Field of Classification Search
CPC .................................................. G06Q 30/0209
USPC .................................. 725/23, 34, 35, 37–61; 705/14.49–14.53
See application file for complete search history.

(56) References Cited

U.S. PATENT DOCUMENTS

| | | | |
|---|---|---|---|
| 4,521,021 A | 6/1985 | Dixon | |
| 4,542,897 A | 9/1985 | Melton et al. | |

(Continued)

FOREIGN PATENT DOCUMENTS

| | | |
|---|---|---|
| CA | 2106122 A1 | 3/1994 |
| EP | 0 337 539 A2 | 10/1989 |

(Continued)

OTHER PUBLICATIONS

Business Wire, "RTIME Announces First 100-Person Twitch Game for Internet: "RTIME Rocks!" Demonstrates the Power of the RTIME Interactive Networking Engine to Support Large Scale, High Performance, Internet Game Play," Apr. 14, 1997.

(Continued)

*Primary Examiner* — Nicholas Corbo
*Assistant Examiner* — Alexander Q Huerta
(74) *Attorney, Agent, or Firm* — Lewis Roca Rothgerber LLP

(57) ABSTRACT

A system and method for placing an advertisement in a digital environment based upon a user's choice, subject to certain predetermined parameters, is disclosed. Through the method, a user is assigned a rating based upon, for example, his performance in a game. A list of advertisements which correspond to that rating is displayed to the user, who may then select a desired advertisement from the list. The selected advertisement is then displayed in the digital environment. Reports may be generated based upon the advertisements selected and the number of selections and/or impressions (e.g., uses or viewings) by the user, which may be sent to advertisers.

21 Claims, 6 Drawing Sheets

(51) Int. Cl.

| | | |
|---|---|---|
| *H04N 7/173* | (2011.01) | |
| *H04N 21/44* | (2011.01) | |
| *H04N 21/45* | (2011.01) | |
| *H04N 21/472* | (2011.01) | |
| *H04N 21/478* | (2011.01) | |
| *H04N 21/482* | (2011.01) | |
| *H04N 21/81* | (2011.01) | |
| *H04N 21/845* | (2011.01) | |
| *H04N 21/858* | (2011.01) | |

(52) U.S. Cl.
CPC .......... *G06Q 30/0276* (2013.01); *H04N 7/173* (2013.01); *H04N 21/44012* (2013.01); *H04N 21/4532* (2013.01); *H04N 21/4781* (2013.01); *H04N 21/47205* (2013.01); *H04N 21/47815* (2013.01); *H04N 21/4825* (2013.01); *H04N 21/812* (2013.01); *H04N 21/8453* (2013.01); *H04N 21/8583* (2013.01); *A63F 2300/535* (2013.01); *A63F 2300/5506* (2013.01); *A63F 2300/61* (2013.01); *A63F 2300/8017* (2013.01)

(56) References Cited

U.S. PATENT DOCUMENTS

| | | |
|---|---|---|
| 4,734,690 A | 3/1988 | Waller |
| 4,807,158 A | 2/1989 | Blanton et al. |
| 4,905,168 A | 2/1990 | McCarthy et al. |
| 4,926,255 A | 5/1990 | Von Kohorn |
| 4,969,036 A | 11/1990 | Bhanu et al. |
| 5,014,234 A | 5/1991 | Edwards, Jr. |
| 5,083,271 A | 1/1992 | Thacher et al. |
| 5,105,184 A | 4/1992 | Pirani et al. |
| 5,227,874 A | 7/1993 | Von Kohorn |
| 5,231,568 A | 7/1993 | Cohen et al. |
| 5,283,731 A | 2/1994 | Lalonde et al. |
| 5,305,195 A | 4/1994 | Murphy |
| 5,305,389 A | 4/1994 | Palmer |
| 5,319,454 A | 6/1994 | Schutte |
| 5,347,632 A | 9/1994 | Filepp et al. |
| 5,373,440 A | 12/1994 | Cohen et al. |
| 5,377,997 A | 1/1995 | Wilden et al. |
| 5,446,919 A | 8/1995 | Wilkins |
| 5,462,275 A | 10/1995 | Lowe et al. |
| 5,497,479 A | 3/1996 | Hornbuckle |
| 5,512,935 A | 4/1996 | Majeti et al. |
| 5,526,041 A | 6/1996 | Glatt |
| 5,539,450 A | 7/1996 | Handelman |
| 5,548,645 A | 8/1996 | Ananda |
| 5,564,038 A | 10/1996 | Grantz et al. |
| 5,565,909 A | 10/1996 | Thibadeau et al. |
| 5,572,643 A | 11/1996 | Judson |
| 5,592,212 A | 1/1997 | Handelman |
| 5,630,757 A | 5/1997 | Gagin et al. |
| 5,636,346 A | 6/1997 | Saxe |
| 5,663,757 A | 9/1997 | Morales |
| 5,684,526 A | 11/1997 | Yoshinobu |
| 5,697,844 A | 12/1997 | Von Kohorn |
| 5,699,497 A | 12/1997 | Erdahl et al. |
| 5,707,289 A | 1/1998 | Watanabe et al. |
| 5,712,979 A | 1/1998 | Graber et al. |
| 5,721,827 A | 2/1998 | Logan et al. |
| 5,724,521 A | 3/1998 | Dedrick |
| 5,737,619 A | 4/1998 | Judson |
| 5,748,867 A | 5/1998 | Cosman et al. |
| 5,751,956 A | 5/1998 | Kirsch |
| 5,758,068 A | 5/1998 | Brandt et al. |
| 5,758,257 A | 5/1998 | Herz et al. |
| 5,771,347 A | 6/1998 | Grantz et al. |
| 5,774,170 A | 6/1998 | Hite et al. |
| 5,794,210 A | 8/1998 | Goldhaber et al. |
| 5,798,519 A | 8/1998 | Vock et al. |
| 5,805,815 A | 9/1998 | Hill |
| 5,822,523 A | 10/1998 | Rothschild et al. |
| 5,848,396 A | 12/1998 | Gerace |
| 5,855,008 A | 12/1998 | Goldhaber et al. |
| 5,857,149 A | 1/1999 | Suzuki |
| 5,860,073 A | 1/1999 | Ferrel et al. |
| 5,867,208 A | 2/1999 | McLaren |
| 5,876,286 A | 3/1999 | Lee |
| 5,879,235 A | 3/1999 | Kaneko et al. |
| 5,903,816 A | 5/1999 | Broadwin et al. |
| 5,910,987 A | 6/1999 | Ginter et al. |
| 5,911,582 A | 6/1999 | Redford |
| 5,916,024 A | 6/1999 | Von Kohorn |
| 5,917,725 A | 6/1999 | Thacher et al. |
| 5,929,850 A | 7/1999 | Broadwin et al. |
| 5,937,037 A | 8/1999 | Kamel et al. |
| 5,946,646 A | 8/1999 | Schena et al. |
| 5,946,664 A | 8/1999 | Ebisawa |
| 5,948,061 A | 9/1999 | Merriman et al. |
| 5,964,660 A | 10/1999 | James et al. |
| 5,970,143 A | 10/1999 | Schneier et al. |
| 5,974,398 A | 10/1999 | Hanson et al. |
| 5,987,511 A | 11/1999 | Elixmann et al. |
| 5,991,735 A | 11/1999 | Gerace |
| 6,005,602 A | 12/1999 | Matthews, III |
| 6,012,984 A | 1/2000 | Roseman |
| 6,015,348 A | 1/2000 | Lambright et al. |
| 6,020,883 A | 2/2000 | Herz et al. |
| 6,024,643 A | 2/2000 | Begis |
| 6,026,368 A | 2/2000 | Brown et al. |
| 6,029,046 A | 2/2000 | Khan et al. |
| 6,036,601 A | 3/2000 | Heckel |
| 6,047,289 A | 4/2000 | Thorne et al. |
| 6,088,722 A | 7/2000 | Herz et al. |
| 6,108,637 A | 8/2000 | Blumenau |
| 6,113,494 A | 9/2000 | Lennert |
| 6,119,098 A | 9/2000 | Guyot et al. |
| 6,149,519 A | 11/2000 | Osaki et al. |
| 6,151,631 A | 11/2000 | Ansell et al. |
| 6,165,070 A | 12/2000 | Nolte et al. |
| 6,179,713 B1 | 1/2001 | James et al. |
| 6,181,988 B1 | 1/2001 | Schneider et al. |
| 6,188,398 B1 | 2/2001 | Collins-Rector et al. |
| 6,196,920 B1 | 3/2001 | Spaur et al. |
| 6,199,082 B1 | 3/2001 | Ferrel et al. |
| 6,216,129 B1 | 4/2001 | Eldering |
| 6,236,975 B1 | 5/2001 | Boe et al. |
| 6,238,290 B1 | 5/2001 | Tarr et al. |
| 6,251,017 B1 | 6/2001 | Leason et al. |
| 6,263,360 B1 | 7/2001 | Arnold et al. |
| 6,264,555 B1 | 7/2001 | Glazman et al. |
| 6,264,560 B1 | 7/2001 | Goldberg et al. |
| 6,267,672 B1 | 7/2001 | Vance |
| 6,267,675 B1 | 7/2001 | Lee |
| 6,275,854 B1 | 8/2001 | Himmel et al. |
| 6,275,989 B1 | 8/2001 | Broadwin et al. |
| 6,298,348 B1 | 10/2001 | Eldering |
| 6,308,328 B1 | 10/2001 | Bowcutt et al. |
| 6,312,337 B1 | 11/2001 | Edwards et al. |
| 6,320,495 B1 | 11/2001 | Sporgis |
| 6,324,519 B1 | 11/2001 | Eldering |
| 6,343,990 B1 | 2/2002 | Rasmussen et al. |
| 6,346,045 B2 | 2/2002 | Rider et al. |
| 6,366,701 B1 | 4/2002 | Chalom et al. |
| 6,371,850 B1 | 4/2002 | Sonoda |
| 6,379,251 B1 | 4/2002 | Auxier et al. |
| 6,381,362 B1 | 4/2002 | Deshpande et al. |
| 6,385,592 B1 | 5/2002 | Angles et al. |
| 6,390,922 B1 | 5/2002 | Vange et al. |
| 6,393,574 B1 | 5/2002 | Kashiwagi et al. |
| 6,394,899 B1 | 5/2002 | Walker |
| 6,400,996 B1 | 6/2002 | Hoffberg et al. |
| 6,411,936 B1 | 6/2002 | Sanders |
| 6,434,614 B1 | 8/2002 | Blumenau |
| 6,443,843 B1 | 9/2002 | Walker et al. |
| 6,446,130 B1 | 9/2002 | Grapes |
| 6,446,261 B1 | 9/2002 | Rosser |
| 6,456,234 B1 | 9/2002 | Johnson |
| 6,457,010 B1 | 9/2002 | Eldering et al. |
| 6,460,036 B1 | 10/2002 | Herz |
| 6,468,155 B1 | 10/2002 | Zucker et al. |

(56) References Cited

U.S. PATENT DOCUMENTS

| | | | |
|---|---|---|---|
| 6,470,138 B1 | 10/2002 | Um et al. |
| 6,484,148 B1 | 11/2002 | Boyd |
| 6,484,149 B1 | 11/2002 | Jammes et al. |
| 6,489,955 B1 | 12/2002 | Newhall, Jr. |
| 6,496,826 B1 | 12/2002 | Chowdhury et al. |
| 6,513,160 B2 | 1/2003 | Dureau |
| 6,516,338 B1 | 2/2003 | Landsman et al. |
| 6,529,940 B1 | 3/2003 | Humble |
| 6,530,840 B1 | 3/2003 | Cuomo et al. |
| 6,532,448 B1 | 3/2003 | Higginson et al. |
| 6,539,375 B2 | 3/2003 | Kawasaki |
| 6,539,544 B2 | 3/2003 | Ebisawa |
| 6,553,178 B2 | 4/2003 | Abecassis |
| 6,560,578 B2 | 5/2003 | Eldering |
| 6,563,523 B1 | 5/2003 | Suchocki et al. |
| 6,564,217 B2 | 5/2003 | Bunney et al. |
| 6,595,859 B2 | 7/2003 | Lynn |
| 6,606,746 B1 | 8/2003 | Zdepski et al. |
| 6,611,812 B2 | 8/2003 | Hurtado et al. |
| 6,611,813 B1 | 8/2003 | Bratton |
| 6,611,957 B2 | 8/2003 | Ebisawa |
| 6,612,932 B2 | 9/2003 | Stern |
| 6,615,039 B1 | 9/2003 | Eldering |
| 6,616,533 B1 | 9/2003 | Rashkovskiy |
| 6,625,578 B2 * | 9/2003 | Spaur et al. ............... 705/14.5 |
| 6,632,138 B1 | 10/2003 | Serizawa et al. |
| 6,640,097 B2 | 10/2003 | Corrigan et al. |
| 6,640,335 B2 | 10/2003 | Ebisawa |
| 6,640,336 B1 | 10/2003 | Ebisawa |
| 6,645,068 B1 | 11/2003 | Kelly et al. |
| 6,654,725 B1 | 11/2003 | Langheinrich et al. |
| 6,656,050 B2 | 12/2003 | Busch et al. |
| 6,659,861 B1 | 12/2003 | Faris et al. |
| 6,663,105 B1 | 12/2003 | Sullivan et al. |
| 6,669,562 B1 | 12/2003 | Shiino |
| 6,669,564 B1 | 12/2003 | Young et al. |
| 6,680,746 B2 | 1/2004 | Kawai et al. |
| 6,683,941 B2 | 1/2004 | Brown et al. |
| 6,684,194 B1 | 1/2004 | Eldering et al. |
| 6,687,608 B2 | 2/2004 | Sugimoto et al. |
| 6,697,792 B2 | 2/2004 | Bunney et al. |
| 6,698,020 B1 | 2/2004 | Zigmond et al. |
| 6,699,127 B1 | 3/2004 | Lobb et al. |
| 6,701,363 B1 | 3/2004 | Chiu et al. |
| 6,704,930 B1 | 3/2004 | Eldering et al. |
| 6,709,335 B2 | 3/2004 | Bates et al. |
| 6,712,702 B2 * | 3/2004 | Goldberg et al. ............... 463/42 |
| 6,714,236 B1 | 3/2004 | Wada et al. |
| 6,714,723 B2 | 3/2004 | Abecassis |
| 6,714,917 B1 | 3/2004 | Eldering et al. |
| 6,716,103 B1 | 4/2004 | Eck et al. |
| 6,718,551 B1 | 4/2004 | Swix et al. |
| 6,721,748 B1 | 4/2004 | Knight et al. |
| 6,731,238 B2 | 5/2004 | Johnson |
| 6,738,078 B1 | 5/2004 | Duncombe |
| 6,745,011 B1 | 6/2004 | Hendrickson et al. |
| 6,757,740 B1 | 6/2004 | Parekh et al. |
| 6,758,746 B1 | 7/2004 | Hunter et al. |
| 6,758,754 B1 | 7/2004 | Lavanchy et al. |
| 6,758,755 B2 | 7/2004 | Kelly et al. |
| 6,764,395 B1 | 7/2004 | Guyett |
| 6,764,403 B2 | 7/2004 | Gavin |
| 6,771,290 B1 | 8/2004 | Hoyle |
| 6,783,460 B2 | 8/2004 | Galyean, III et al. |
| 6,785,902 B1 | 8/2004 | Zigmond et al. |
| 6,799,327 B1 | 9/2004 | Reynolds et al. |
| 6,814,663 B2 | 11/2004 | Edwards et al. |
| 6,820,277 B1 | 11/2004 | Eldering et al. |
| 6,826,614 B1 | 11/2004 | Hanmann et al. |
| 6,827,645 B2 | 12/2004 | Morita et al. |
| 6,840,861 B2 | 1/2005 | Jordan et al. |
| 6,863,612 B2 | 3/2005 | Willis |
| 6,874,683 B2 | 4/2005 | Keronen et al. |
| 6,882,978 B2 | 4/2005 | Ebisawa |
| 6,890,256 B2 | 5/2005 | Walker et al. |
| 6,895,170 B1 | 5/2005 | Lambert et al. |
| 6,912,398 B1 | 6/2005 | Domnitz |
| 6,928,414 B1 | 8/2005 | Kim |
| 6,941,574 B1 | 9/2005 | Broadwin et al. |
| 6,942,575 B2 | 9/2005 | Mergler |
| 6,954,728 B1 * | 10/2005 | Kusumoto et al. ............... 705/1 |
| 6,955,605 B2 | 10/2005 | Young et al. |
| 6,964,608 B1 | 11/2005 | Koza |
| 6,967,566 B2 | 11/2005 | Weston et al. |
| 6,968,567 B1 | 11/2005 | Gordon et al. |
| 6,970,834 B2 | 11/2005 | Martin et al. |
| 6,970,915 B1 | 11/2005 | Partovi et al. |
| 6,973,664 B2 | 12/2005 | Fries |
| 6,987,221 B2 | 1/2006 | Platt |
| 6,995,788 B2 | 2/2006 | James |
| 7,028,082 B1 | 4/2006 | Rosenberg et al. |
| 7,072,849 B1 | 7/2006 | Filepp et al. |
| 7,076,445 B1 | 7/2006 | Cartwright |
| 7,086,187 B2 | 8/2006 | Bandak |
| 7,136,871 B2 | 11/2006 | Ozer et al. |
| 7,305,442 B1 | 12/2007 | Lundy |
| 7,362,999 B2 | 4/2008 | Petschke et al. |
| 7,363,643 B2 | 4/2008 | Drake et al. |
| 7,370,002 B2 | 5/2008 | Heckerman et al. |
| 7,370,073 B2 | 5/2008 | Yen et al. |
| 7,386,127 B2 | 6/2008 | Bar-On |
| 7,401,140 B2 | 7/2008 | Goulden et al. |
| 7,421,454 B2 | 9/2008 | DeShan et al. |
| 7,437,368 B1 | 10/2008 | Kolluri et al. |
| 7,466,823 B2 | 12/2008 | Vestergaard et al. |
| 7,487,112 B2 | 2/2009 | Barnes, Jr. |
| 7,594,189 B1 | 9/2009 | Walker et al. |
| 7,707,485 B2 | 4/2010 | Laksono |
| 7,852,222 B2 | 12/2010 | Johnson et al. |
| 8,005,713 B1 | 8/2011 | Sanz-Pastor et al. |
| 8,024,766 B2 | 9/2011 | Addington |
| 8,074,076 B2 | 12/2011 | Courtois |
| 8,175,921 B1 | 5/2012 | Kopra |
| 8,191,088 B2 | 5/2012 | Edwards et al. |
| 8,267,783 B2 | 9/2012 | van Datta |
| 8,272,964 B2 | 9/2012 | van Datta |
| 8,302,030 B2 | 10/2012 | Soroca et al. |
| 8,406,739 B2 | 3/2013 | Hull et al. |
| 8,574,074 B2 | 11/2013 | van Datta |
| 8,626,584 B2 | 1/2014 | van Datta |
| 8,645,992 B2 | 2/2014 | Russell |
| 8,676,900 B2 | 3/2014 | Yruski |
| 8,751,310 B2 | 6/2014 | van Datta |
| 8,763,090 B2 | 6/2014 | Capati |
| 8,763,157 B2 | 6/2014 | Navar |
| 8,769,558 B2 | 7/2014 | Navar |
| 8,795,076 B2 | 8/2014 | van Datta |
| 9,015,747 B2 | 4/2015 | Russell |
| 2001/0011226 A1 | 8/2001 | Greer et al. |
| 2001/0013009 A1 | 8/2001 | Greening et al. |
| 2001/0014915 A1 | 8/2001 | Blumenau |
| 2001/0025245 A1 | 9/2001 | Flickinger et al. |
| 2001/0025254 A1 | 9/2001 | Park |
| 2001/0025274 A1 | 9/2001 | Zehr et al. |
| 2001/0027412 A1 | 10/2001 | Son |
| 2001/0032125 A1 | 10/2001 | Bhan et al. |
| 2001/0032132 A1 | 10/2001 | Moran |
| 2001/0032133 A1 | 10/2001 | Moran |
| 2001/0032137 A1 | 10/2001 | Bennett et al. |
| 2001/0032333 A1 | 10/2001 | Flickinger |
| 2001/0034643 A1 | 10/2001 | Acres |
| 2001/0034762 A1 | 10/2001 | Jacobs et al. |
| 2001/0037232 A1 | 11/2001 | Miller |
| 2001/0039210 A1 | 11/2001 | St-Denis |
| 2001/0047297 A1 | 11/2001 | Wen |
| 2001/0049620 A1 | 12/2001 | Blasko |
| 2001/0052123 A1 | 12/2001 | Kawai |
| 2002/0004743 A1 | 1/2002 | Kutaragi et al. |
| 2002/0004744 A1 | 1/2002 | Muyres et al. |
| 2002/0007307 A1 | 1/2002 | Miller et al. |
| 2002/0007310 A1 | 1/2002 | Long |
| 2002/0010626 A1 | 1/2002 | Agmoni |
| 2002/0010628 A1 | 1/2002 | Burns |
| 2002/0010757 A1 | 1/2002 | Granik et al. |

(56) References Cited

U.S. PATENT DOCUMENTS

| | | |
|---|---|---|
| 2002/0013174 A1 | 1/2002 | Murata |
| 2002/0018076 A1 | 2/2002 | Gianola |
| 2002/0018982 A1 | 2/2002 | Conroy |
| 2002/0019774 A1 | 2/2002 | Kanter |
| 2002/0022476 A1 | 2/2002 | Go |
| 2002/0022516 A1 | 2/2002 | Forden |
| 2002/0023000 A1 | 2/2002 | Bollay |
| 2002/0026345 A1 | 2/2002 | Juels |
| 2002/0026355 A1 | 2/2002 | Mitsuoka et al. |
| 2002/0026638 A1 | 2/2002 | Eldering et al. |
| 2002/0032608 A1 | 3/2002 | Kanter |
| 2002/0032626 A1 | 3/2002 | DeWolf et al. |
| 2002/0032906 A1 | 3/2002 | Grossman |
| 2002/0044687 A1 | 4/2002 | Federman |
| 2002/0046087 A1 | 4/2002 | Hey |
| 2002/0046095 A1 | 4/2002 | Wallace |
| 2002/0046102 A1 | 4/2002 | Dohring et al. |
| 2002/0049968 A1 | 4/2002 | Wilson et al. |
| 2002/0051521 A1 | 5/2002 | Patrick |
| 2002/0055833 A1 | 5/2002 | Sterling |
| 2002/0055876 A1 | 5/2002 | Gabler |
| 2002/0056107 A1 | 5/2002 | Schlack |
| 2002/0059577 A1 | 5/2002 | Lu et al. |
| 2002/0059590 A1 | 5/2002 | Kitsukawa et al. |
| 2002/0059610 A1* | 5/2002 | Ellis ............................... 725/58 |
| 2002/0061778 A1 | 5/2002 | Acres |
| 2002/0067730 A1 | 6/2002 | Hinderks et al. |
| 2002/0069240 A1 | 6/2002 | Berk |
| 2002/0069405 A1 | 6/2002 | Chapin et al. |
| 2002/0072965 A1 | 6/2002 | Merriman et al. |
| 2002/0072966 A1 | 6/2002 | Eldering et al. |
| 2002/0073235 A1 | 6/2002 | Chen et al. |
| 2002/0077906 A1 | 6/2002 | Remler |
| 2002/0078441 A1 | 6/2002 | Drake et al. |
| 2002/0078444 A1 | 6/2002 | Krewin et al. |
| 2002/0082077 A1 | 6/2002 | Johnson et al. |
| 2002/0082910 A1 | 6/2002 | Kontogouris |
| 2002/0082913 A1 | 6/2002 | Li |
| 2002/0082941 A1 | 6/2002 | Bird |
| 2002/0083435 A1 | 6/2002 | Blasko et al. |
| 2002/0083439 A1 | 6/2002 | Eldering |
| 2002/0083441 A1 | 6/2002 | Flickinger et al. |
| 2002/0083442 A1 | 6/2002 | Eldering |
| 2002/0083443 A1 | 6/2002 | Eldering et al. |
| 2002/0083444 A1 | 6/2002 | Blasko et al. |
| 2002/0083445 A1 | 6/2002 | Flickinger et al. |
| 2002/0083451 A1 | 6/2002 | Gill et al. |
| 2002/0087402 A1* | 7/2002 | Zustak et al. .................... 705/14 |
| 2002/0087403 A1 | 7/2002 | Meyers et al. |
| 2002/0087887 A1 | 7/2002 | Busam et al. |
| 2002/0087973 A1 | 7/2002 | Hamilton et al. |
| 2002/0087975 A1 | 7/2002 | Schlack |
| 2002/0087980 A1 | 7/2002 | Eldering et al. |
| 2002/0094868 A1 | 7/2002 | Tuck et al. |
| 2002/0095676 A1 | 7/2002 | Knee et al. |
| 2002/0098891 A1 | 7/2002 | Graham et al. |
| 2002/0099600 A1 | 7/2002 | Merriman et al. |
| 2002/0099611 A1 | 7/2002 | De Souza et al. |
| 2002/0099653 A1 | 7/2002 | De Souza et al. |
| 2002/0100040 A1 | 7/2002 | Bull |
| 2002/0107073 A1 | 8/2002 | Binney |
| 2002/0107075 A1 | 8/2002 | Stephan |
| 2002/0107730 A1 | 8/2002 | Bernstein |
| 2002/0109680 A1 | 8/2002 | Orbanes et al. |
| 2002/0111154 A1 | 8/2002 | Eldering et al. |
| 2002/0111172 A1 | 8/2002 | DeWolf et al. |
| 2002/0111825 A1 | 8/2002 | Martin et al. |
| 2002/0111865 A1 | 8/2002 | Middleton, III et al. |
| 2002/0112035 A1 | 8/2002 | Carey et al. |
| 2002/0112233 A1 | 8/2002 | Cantu Bonilla et al. |
| 2002/0112240 A1 | 8/2002 | Basco et al. |
| 2002/0112249 A1 | 8/2002 | Hendricks et al. |
| 2002/0112250 A1 | 8/2002 | Koplar et al. |
| 2002/0114466 A1 | 8/2002 | Tanaka et al. |
| 2002/0116284 A1 | 8/2002 | Steelman et al. |
| 2002/0120589 A1 | 8/2002 | Aoki |
| 2002/0122052 A1 | 9/2002 | Reich et al. |
| 2002/0123928 A1 | 9/2002 | Eldering et al. |
| 2002/0129368 A1 | 9/2002 | Schlack et al. |
| 2002/0133398 A1 | 9/2002 | Geller et al. |
| 2002/0136407 A1 | 9/2002 | Denning et al. |
| 2002/0138493 A1 | 9/2002 | Shapiro et al. |
| 2002/0143639 A1 | 10/2002 | Beckett et al. |
| 2002/0143652 A1 | 10/2002 | Beckett |
| 2002/0143782 A1 | 10/2002 | Headings et al. |
| 2002/0143901 A1 | 10/2002 | Lupo et al. |
| 2002/0144262 A1 | 10/2002 | Plotnick et al. |
| 2002/0144263 A1 | 10/2002 | Eldering et al. |
| 2002/0147633 A1 | 10/2002 | Rafizadeh |
| 2002/0147638 A1 | 10/2002 | Banerjee et al. |
| 2002/0147645 A1 | 10/2002 | Alao et al. |
| 2002/0152117 A1 | 10/2002 | Cristofalo et al. |
| 2002/0155878 A1 | 10/2002 | Lert, Jr. et al. |
| 2002/0155891 A1 | 10/2002 | Okada et al. |
| 2002/0157002 A1 | 10/2002 | Messerges et al. |
| 2002/0161625 A1 | 10/2002 | Brito-Valladares et al. |
| 2002/0161639 A1 | 10/2002 | Goldstein |
| 2002/0164977 A1 | 11/2002 | Link, II et al. |
| 2002/0164999 A1 | 11/2002 | Johnson |
| 2002/0165026 A1 | 11/2002 | Perkins et al. |
| 2002/0165764 A1 | 11/2002 | Wade et al. |
| 2002/0173349 A1 | 11/2002 | Ach, III |
| 2002/0173359 A1 | 11/2002 | Gallo et al. |
| 2002/0175936 A1 | 11/2002 | Tenembaum |
| 2002/0178442 A1 | 11/2002 | Williams |
| 2002/0178445 A1 | 11/2002 | Eldering et al. |
| 2002/0178447 A1 | 11/2002 | Plotnick et al. |
| 2002/0184047 A1 | 12/2002 | Plotnick et al. |
| 2002/0184086 A1 | 12/2002 | Linde |
| 2002/0184088 A1 | 12/2002 | Rosenberg |
| 2002/0184130 A1 | 12/2002 | Blasko |
| 2002/0184642 A1 | 12/2002 | Lude et al. |
| 2002/0193066 A1 | 12/2002 | Connelly |
| 2002/0194058 A1 | 12/2002 | Eldering |
| 2002/0194585 A1 | 12/2002 | Connelly |
| 2002/0194590 A1 | 12/2002 | Pong |
| 2002/0194598 A1 | 12/2002 | Connelly |
| 2002/0194607 A1 | 12/2002 | Connelly |
| 2003/0004810 A1 | 1/2003 | Eldering |
| 2003/0009762 A1 | 1/2003 | Hooper et al. |
| 2003/0014307 A1 | 1/2003 | Heng |
| 2003/0014312 A1 | 1/2003 | Fleisher |
| 2003/0014414 A1 | 1/2003 | Newman |
| 2003/0014754 A1 | 1/2003 | Chang |
| 2003/0018527 A1 | 1/2003 | Filepp et al. |
| 2003/0018797 A1 | 1/2003 | Dunning et al. |
| 2003/0028433 A1 | 2/2003 | Merriman et al. |
| 2003/0033405 A1 | 2/2003 | Perdon et al. |
| 2003/0035075 A1 | 2/2003 | Butler et al. |
| 2003/0036944 A1 | 2/2003 | Lesandrini et al. |
| 2003/0046148 A1 | 3/2003 | Rizzi et al. |
| 2003/0048293 A1 | 3/2003 | Werkhoven |
| 2003/0054888 A1 | 3/2003 | Walker et al. |
| 2003/0060247 A1 | 3/2003 | Goldberg et al. |
| 2003/0066092 A1 | 4/2003 | Wagner et al. |
| 2003/0070167 A1 | 4/2003 | Holtz et al. |
| 2003/0073496 A1 | 4/2003 | D'Amico et al. |
| 2003/0074252 A1 | 4/2003 | Chandler-Pepelnjak et al. |
| 2003/0076347 A1 | 4/2003 | Barrett et al. |
| 2003/0079226 A1 | 4/2003 | Barrett |
| 2003/0084449 A1 | 5/2003 | Chane et al. |
| 2003/0084456 A1 | 5/2003 | Ryan et al. |
| 2003/0093311 A1 | 5/2003 | Knowlson |
| 2003/0100375 A1 | 5/2003 | Wakae et al. |
| 2003/0101449 A1 | 5/2003 | Bentolila et al. |
| 2003/0101451 A1 | 5/2003 | Bentolila et al. |
| 2003/0101454 A1 | 5/2003 | Ozer et al. |
| 2003/0103644 A1* | 6/2003 | Klayh ............................. 382/100 |
| 2003/0104867 A1 | 6/2003 | Kobayashi et al. |
| 2003/0110131 A1 | 6/2003 | Alain et al. |
| 2003/0110171 A1 | 6/2003 | Ozer et al. |
| 2003/0110499 A1 | 6/2003 | Knudson et al. |
| 2003/0115074 A1 | 6/2003 | Freeman et al. |
| 2003/0115318 A1 | 6/2003 | Wueste |

(56) References Cited

U.S. PATENT DOCUMENTS

| | | |
|---|---|---|
| 2003/0115587 A1 | 6/2003 | Kendall et al. |
| 2003/0126150 A1 | 7/2003 | Chan |
| 2003/0135513 A1 | 7/2003 | Quinn et al. |
| 2003/0139966 A1 | 7/2003 | Sirota et al. |
| 2003/0144044 A1 | 7/2003 | Piarsky |
| 2003/0144048 A1 | 7/2003 | Silva |
| 2003/0149618 A1 | 8/2003 | Sender et al. |
| 2003/0149623 A1 | 8/2003 | Chen |
| 2003/0149938 A1 | 8/2003 | McElfresh et al. |
| 2003/0149975 A1 | 8/2003 | Eldering et al. |
| 2003/0158872 A1 | 8/2003 | Adams |
| 2003/0163369 A1 | 8/2003 | Arr |
| 2003/0163482 A1 | 8/2003 | Bunney et al. |
| 2003/0171988 A1 | 9/2003 | Sugihara |
| 2003/0171990 A1 | 9/2003 | Rao et al. |
| 2003/0172376 A1 | 9/2003 | Coffin, III |
| 2003/0177490 A1 | 9/2003 | Hoshino et al. |
| 2003/0182567 A1 | 9/2003 | Barton et al. |
| 2003/0182663 A1 | 9/2003 | Gudorf et al. |
| 2003/0187719 A1 | 10/2003 | Brocklebank |
| 2003/0190961 A1 | 10/2003 | Seidman |
| 2003/0191690 A1 | 10/2003 | McIntyre et al. |
| 2003/0191742 A1 | 10/2003 | Yonezawa et al. |
| 2003/0195021 A1 | 10/2003 | Yamashita et al. |
| 2003/0195801 A1 | 10/2003 | Takakura et al. |
| 2003/0195837 A1 | 10/2003 | Kostic et al. |
| 2003/0199292 A1 | 10/2003 | Greenberg |
| 2003/0200452 A1 | 10/2003 | Tagawa et al. |
| 2003/0204632 A1 | 10/2003 | Willebeek-LeMair et al. |
| 2003/0212608 A1 | 11/2003 | Cliff |
| 2003/0215211 A1 | 11/2003 | Coffin, III |
| 2003/0216961 A1 | 11/2003 | Barry |
| 2003/0226141 A1 | 12/2003 | Krasnow et al. |
| 2003/0226142 A1 | 12/2003 | Rand |
| 2003/0229893 A1 | 12/2003 | Sgaraglino |
| 2004/0002380 A1 | 1/2004 | Brosnan et al. |
| 2004/0003396 A1 | 1/2004 | Babu |
| 2004/0014454 A1 | 1/2004 | Burgess et al. |
| 2004/0015397 A1 | 1/2004 | Barry et al. |
| 2004/0015608 A1* | 1/2004 | Ellis et al. .................. 709/246 |
| 2004/0019521 A1 | 1/2004 | Birmingham |
| 2004/0025174 A1 | 2/2004 | Cerrato |
| 2004/0030595 A1 | 2/2004 | Park |
| 2004/0034536 A1 | 2/2004 | Hughes |
| 2004/0034686 A1 | 2/2004 | Guthrie |
| 2004/0039648 A1 | 2/2004 | Candelore et al. |
| 2004/0039796 A1 | 2/2004 | Watkins |
| 2004/0043817 A1 | 3/2004 | Willis |
| 2004/0043819 A1 | 3/2004 | Willis |
| 2004/0044567 A1 | 3/2004 | Willis |
| 2004/0044569 A1 | 3/2004 | Roberts et al. |
| 2004/0044571 A1 | 3/2004 | Bronnimann et al. |
| 2004/0044574 A1 | 3/2004 | Cochran et al. |
| 2004/0054589 A1 | 3/2004 | Nicolas et al. |
| 2004/0057348 A1 | 3/2004 | Shteyn et al. |
| 2004/0059625 A1 | 3/2004 | Schrader |
| 2004/0068552 A1 | 4/2004 | Kotz et al. |
| 2004/0073482 A1 | 4/2004 | Wiggins et al. |
| 2004/0078263 A1 | 4/2004 | Altieri |
| 2004/0078266 A1 | 4/2004 | Kim |
| 2004/0078292 A1 | 4/2004 | Blumenau |
| 2004/0078809 A1 | 4/2004 | Drazin |
| 2004/0083133 A1 | 4/2004 | Nicholas et al. |
| 2004/0088583 A1 | 5/2004 | Yoon et al. |
| 2004/0102248 A1 | 5/2004 | Young et al. |
| 2004/0103024 A1 | 5/2004 | Patel et al. |
| 2004/0103429 A1 | 5/2004 | Carlucci et al. |
| 2004/0107136 A1 | 6/2004 | Nemirofsky et al. |
| 2004/0110565 A1 | 6/2004 | Levesque |
| 2004/0111317 A1 | 6/2004 | Ebisawa |
| 2004/0111484 A1 | 6/2004 | Young et al. |
| 2004/0116183 A1 | 6/2004 | Prindle |
| 2004/0117272 A1 | 6/2004 | Shehab |
| 2004/0121835 A1 | 6/2004 | Willis et al. |
| 2004/0121842 A1 | 6/2004 | Willis et al. |
| 2004/0126747 A1 | 7/2004 | Fujisawa et al. |
| 2004/0133480 A1 | 7/2004 | Domes |
| 2004/0133518 A1 | 7/2004 | Dryall |
| 2004/0137980 A1 | 7/2004 | Aenlle |
| 2004/0139465 A1 | 7/2004 | Matthews, III et al. |
| 2004/0140352 A1 | 7/2004 | Walker et al. |
| 2004/0143478 A1 | 7/2004 | Ward |
| 2004/0143495 A1 | 7/2004 | Koenig |
| 2004/0148221 A1 | 7/2004 | Chu |
| 2004/0148424 A1 | 7/2004 | Berkson et al. |
| 2004/0148625 A1 | 7/2004 | Eldering et al. |
| 2004/0152517 A1 | 8/2004 | Hardisty et al. |
| 2004/0152518 A1 | 8/2004 | Kogo |
| 2004/0153360 A1 | 8/2004 | Schumann |
| 2004/0153363 A1 | 8/2004 | Stehling |
| 2004/0153385 A1 | 8/2004 | Allibhoy et al. |
| 2004/0153453 A1 | 8/2004 | Brodie et al. |
| 2004/0158858 A1 | 8/2004 | Paxton |
| 2004/0162758 A1 | 8/2004 | Willis |
| 2004/0162759 A1 | 8/2004 | Willis |
| 2004/0163101 A1 | 8/2004 | Swix et al. |
| 2004/0163134 A1 | 8/2004 | Willis |
| 2004/0168063 A1 | 8/2004 | Revital et al. |
| 2004/0168188 A1 | 8/2004 | Bennington et al. |
| 2004/0168202 A1 | 8/2004 | Ebihara |
| 2004/0169678 A1 | 9/2004 | Oliver |
| 2004/0172324 A1 | 9/2004 | Merriman et al. |
| 2004/0172331 A1 | 9/2004 | Merriman et al. |
| 2004/0172332 A1 | 9/2004 | Merriman et al. |
| 2004/0172343 A1 | 9/2004 | Allibhoy et al. |
| 2004/0176170 A1 | 9/2004 | Eck et al. |
| 2004/0176995 A1 | 9/2004 | Fusz |
| 2004/0177001 A1 | 9/2004 | Salinas |
| 2004/0181808 A1 | 9/2004 | Schaefer et al. |
| 2004/0186766 A1 | 9/2004 | Fellenstein et al. |
| 2004/0186771 A1 | 9/2004 | Squires |
| 2004/0193488 A1 | 9/2004 | Khoo et al. |
| 2004/0194123 A1 | 9/2004 | Fredlund et al. |
| 2004/0194128 A1 | 9/2004 | McIntyre et al. |
| 2004/0201629 A1 | 10/2004 | Bates et al. |
| 2004/0204238 A1 | 10/2004 | Aoki |
| 2004/0204247 A1 | 10/2004 | Walker et al. |
| 2004/0205157 A1 | 10/2004 | Bibelnieks et al. |
| 2004/0205508 A1 | 10/2004 | Wecker et al. |
| 2004/0205807 A1 | 10/2004 | Wilcoxson et al. |
| 2004/0210472 A1 | 10/2004 | Lew et al. |
| 2004/0210489 A1 | 10/2004 | Jackson et al. |
| 2004/0210661 A1 | 10/2004 | Thompson |
| 2004/0210824 A1 | 10/2004 | Shoff et al. |
| 2004/0219977 A1 | 11/2004 | Ebisawa |
| 2004/0220850 A1 | 11/2004 | Ferrer et al. |
| 2004/0221018 A1 | 11/2004 | Ji |
| 2004/0224772 A1 | 11/2004 | Canessa et al. |
| 2004/0225562 A1 | 11/2004 | Turner |
| 2004/0225715 A1 | 11/2004 | Gottfried |
| 2004/0230593 A1 | 11/2004 | Rudin et al. |
| 2004/0230994 A1 | 11/2004 | Urdang et al. |
| 2004/0234932 A1 | 11/2004 | Hughes et al. |
| 2004/0236585 A1 | 11/2004 | Kohnke et al. |
| 2004/0243455 A1 | 12/2004 | Smith |
| 2004/0243466 A1 | 12/2004 | Trzybinski et al. |
| 2004/0243470 A1 | 12/2004 | Ozer et al. |
| 2004/0243623 A1 | 12/2004 | Ozer et al. |
| 2004/0248649 A1 | 12/2004 | Arai et al. |
| 2004/0249786 A1 | 12/2004 | Dabney et al. |
| 2004/0252051 A1 | 12/2004 | Johnson |
| 2004/0254831 A1 | 12/2004 | Dean |
| 2004/0254957 A1 | 12/2004 | Hyotyniemi et al. |
| 2004/0255148 A1 | 12/2004 | Monteiro et al. |
| 2004/0259553 A1 | 12/2004 | Delaney et al. |
| 2004/0260609 A1 | 12/2004 | Loeb et al. |
| 2004/0261125 A1 | 12/2004 | Ellis et al. |
| 2004/0266535 A1 | 12/2004 | Reeves |
| 2004/0266537 A1 | 12/2004 | Morris |
| 2004/0267611 A1 | 12/2004 | Hoerenz |
| 2005/0005242 A1 | 1/2005 | Hoyle |
| 2005/0015267 A1 | 1/2005 | Barringer et al. |
| 2005/0021387 A1 | 1/2005 | Gottfurcht |
| 2005/0021396 A1 | 1/2005 | Pearch et al. |

(56) References Cited

U.S. PATENT DOCUMENTS

| | | |
|---|---|---|
| 2005/0021397 A1 | 1/2005 | Cui et al. |
| 2005/0021403 A1 | 1/2005 | Ozer et al. |
| 2005/0021465 A1 | 1/2005 | Segerstrom |
| 2005/0021470 A1 | 1/2005 | Martin et al. |
| 2005/0021853 A1 | 1/2005 | Parekh et al. |
| 2005/0027587 A1 | 2/2005 | Latona et al. |
| 2005/0027595 A1 | 2/2005 | Ha et al. |
| 2005/0027699 A1 | 2/2005 | Awadallah et al. |
| 2005/0028188 A1 | 2/2005 | Latona et al. |
| 2005/0028195 A1 | 2/2005 | Feinleib et al. |
| 2005/0032577 A1 | 2/2005 | Blackburn et al. |
| 2005/0033700 A1 | 2/2005 | Vogler et al. |
| 2005/0038698 A1 | 2/2005 | Lukose et al. |
| 2005/0038702 A1 | 2/2005 | Merriman et al. |
| 2005/0050070 A1 | 3/2005 | Sheldon |
| 2005/0055725 A1 | 3/2005 | Stewart |
| 2005/0060264 A1 | 3/2005 | Schrock et al. |
| 2005/0075155 A1 | 4/2005 | Sitrick |
| 2005/0075172 A1 | 4/2005 | Coleman |
| 2005/0076051 A1 | 4/2005 | Carobus et al. |
| 2005/0091107 A1 | 4/2005 | Blum |
| 2005/0091108 A1 | 4/2005 | Frost |
| 2005/0091111 A1 | 4/2005 | Green et al. |
| 2005/0096975 A1 | 5/2005 | Moshe |
| 2005/0096983 A1 | 5/2005 | Werkhoven |
| 2005/0097622 A1 | 5/2005 | Zigmond et al. |
| 2005/0101386 A1 | 5/2005 | Lavanchy et al. |
| 2005/0102177 A1 | 5/2005 | Takayama |
| 2005/0102202 A1 | 5/2005 | Linden et al. |
| 2005/0107158 A1 | 5/2005 | Kanisawa et al. |
| 2005/0108095 A1 | 5/2005 | Perlmutter |
| 2005/0113170 A1 | 5/2005 | McHugh |
| 2005/0114526 A1 | 5/2005 | Aoyama |
| 2005/0125286 A1 | 6/2005 | Crippen et al. |
| 2005/0125528 A1 | 6/2005 | Burke et al. |
| 2005/0130725 A1 | 6/2005 | Creamer et al. |
| 2005/0143174 A1 | 6/2005 | Goldman et al. |
| 2005/0144063 A1 | 6/2005 | Spector |
| 2005/0144073 A1 | 6/2005 | Morrisroe et al. |
| 2005/0149396 A1 | 7/2005 | Horowitz et al. |
| 2005/0149397 A1* | 7/2005 | Morgenstern et al. .......... 705/14 |
| 2005/0153760 A1 | 7/2005 | Varley |
| 2005/0154640 A1 | 7/2005 | Kolluri et al. |
| 2005/0154717 A1 | 7/2005 | Watson et al. |
| 2005/0155056 A1 | 7/2005 | Knee et al. |
| 2005/0155083 A1 | 7/2005 | Oh et al. |
| 2005/0160442 A1 | 7/2005 | Kaplowitz |
| 2005/0164757 A1 | 7/2005 | Ebisawa |
| 2005/0165640 A1 | 7/2005 | Kotorov |
| 2005/0165644 A1 | 7/2005 | Beyda et al. |
| 2005/0171865 A1 | 8/2005 | Beardow |
| 2005/0177413 A1 | 8/2005 | Blumberg et al. |
| 2005/0177430 A1 | 8/2005 | Willis |
| 2005/0177431 A1 | 8/2005 | Willis et al. |
| 2005/0177461 A1 | 8/2005 | Rosefelt et al. |
| 2005/0178940 A1 | 8/2005 | Granick |
| 2005/0179685 A1 | 8/2005 | Kake et al. |
| 2005/0182693 A1 | 8/2005 | Alivandi |
| 2005/0182737 A1 | 8/2005 | Brown |
| 2005/0185825 A1 | 8/2005 | Hoshino et al. |
| 2005/0192071 A1 | 9/2005 | Matsuno et al. |
| 2005/0192864 A1 | 9/2005 | Ganz |
| 2005/0193411 A1 | 9/2005 | Funston |
| 2005/0193425 A1 | 9/2005 | Sull et al. |
| 2005/0195157 A1 | 9/2005 | Kramer et al. |
| 2005/0202385 A1 | 9/2005 | Coward et al. |
| 2005/0203804 A1 | 9/2005 | Suzuki et al. |
| 2005/0203811 A1 | 9/2005 | David |
| 2005/0204381 A1 | 9/2005 | Ludvig et al. |
| 2005/0216346 A1 | 9/2005 | Kusumoto et al. |
| 2005/0216348 A1 | 9/2005 | Martin et al. |
| 2005/0216581 A1 | 9/2005 | Blumenau et al. |
| 2005/0222908 A1 | 10/2005 | Altberg et al. |
| 2005/0227749 A1 | 10/2005 | Bender et al. |
| 2005/0228797 A1 | 10/2005 | Koningstein et al. |
| 2005/0235030 A1 | 10/2005 | Lauckhart et al. |
| 2005/0235199 A1 | 10/2005 | Adams |
| 2005/0235310 A1 | 10/2005 | Bies |
| 2005/0235318 A1 | 10/2005 | Grauch et al. |
| 2005/0240476 A1 | 10/2005 | Bigott |
| 2005/0240961 A1* | 10/2005 | Jerding et al. .................. 725/37 |
| 2005/0246736 A1 | 11/2005 | Beyda et al. |
| 2005/0247769 A1 | 11/2005 | Potter et al. |
| 2005/0251539 A1 | 11/2005 | Parekh et al. |
| 2005/0254366 A1 | 11/2005 | Amar |
| 2005/0256768 A1 | 11/2005 | Robinson |
| 2005/0261062 A1 | 11/2005 | Lewin et al. |
| 2005/0261962 A1 | 11/2005 | Chuah |
| 2005/0266906 A1 | 12/2005 | Stevens |
| 2005/0266907 A1 | 12/2005 | Weston et al. |
| 2005/0270537 A1 | 12/2005 | Mian et al. |
| 2005/0283395 A1 | 12/2005 | Lesandrini et al. |
| 2005/0283401 A1 | 12/2005 | Swix et al. |
| 2005/0283797 A1* | 12/2005 | Eldering et al. ................ 725/35 |
| 2005/0286860 A1 | 12/2005 | Conklin |
| 2005/0288999 A1 | 12/2005 | Lerner et al. |
| 2006/0007312 A1 | 1/2006 | James |
| 2006/0031551 A1 | 2/2006 | Agresta et al. |
| 2006/0085517 A1 | 4/2006 | Kaurila |
| 2006/0085816 A1 | 4/2006 | Funk et al. |
| 2006/0090186 A1 | 4/2006 | Santangelo et al. |
| 2006/0130095 A1 | 6/2006 | Willis et al. |
| 2006/0135232 A1 | 6/2006 | Willis |
| 2006/0143650 A1 | 6/2006 | Tanikawa et al. |
| 2006/0150249 A1 | 7/2006 | Gassen et al. |
| 2006/0167747 A1* | 7/2006 | Goodman et al. .............. 705/14 |
| 2006/0193471 A1 | 8/2006 | Stehle |
| 2006/0195859 A1 | 8/2006 | Konig et al. |
| 2006/0195860 A1 | 8/2006 | Eldering et al. |
| 2006/0195902 A1 | 8/2006 | King et al. |
| 2006/0212347 A1 | 9/2006 | Fang et al. |
| 2006/0212350 A1 | 9/2006 | Ellis et al. |
| 2006/0230141 A1 | 10/2006 | Willis |
| 2006/0242667 A1 | 10/2006 | Petersen et al. |
| 2006/0242703 A1 | 10/2006 | Abeni |
| 2006/0248209 A1 | 11/2006 | Chiu |
| 2006/0248569 A1 | 11/2006 | Lienhart et al. |
| 2006/0253323 A1 | 11/2006 | Phan et al. |
| 2006/0253330 A1 | 11/2006 | Maggio et al. |
| 2006/0265503 A1 | 11/2006 | Jones et al. |
| 2006/0268667 A1 | 11/2006 | Jellison, Jr. et al. |
| 2006/0294566 A1 | 12/2006 | Zlattner |
| 2007/0027771 A1 | 2/2007 | Collins et al. |
| 2007/0038508 A1 | 2/2007 | Jain et al. |
| 2007/0038516 A1 | 2/2007 | Apple et al. |
| 2007/0038931 A1 | 2/2007 | Allaire et al. |
| 2007/0050254 A1 | 3/2007 | Driscoll |
| 2007/0050256 A1 | 3/2007 | Walker et al. |
| 2007/0055980 A1 | 3/2007 | Megeid et al. |
| 2007/0061204 A1 | 3/2007 | Ellis et al. |
| 2007/0061838 A1 | 3/2007 | Grubbs et al. |
| 2007/0066271 A1 | 3/2007 | Papulov |
| 2007/0072676 A1* | 3/2007 | Baluja ............................. 463/42 |
| 2007/0073756 A1 | 3/2007 | Manhas et al. |
| 2007/0078706 A1 | 4/2007 | Datta et al. |
| 2007/0078712 A1 | 4/2007 | Ott et al. |
| 2007/0078714 A1 | 4/2007 | Ott |
| 2007/0078989 A1* | 4/2007 | van Datta et al. ............. 709/227 |
| 2007/0079331 A1 | 4/2007 | Datta |
| 2007/0079335 A1 | 4/2007 | McDonough |
| 2007/0083611 A1 | 4/2007 | Farago et al. |
| 2007/0089151 A1 | 4/2007 | Moore et al. |
| 2007/0094081 A1 | 4/2007 | Yruski |
| 2007/0094082 A1 | 4/2007 | Yruski |
| 2007/0094083 A1 | 4/2007 | Yruski |
| 2007/0094363 A1 | 4/2007 | Yruski |
| 2007/0101360 A1 | 5/2007 | Gutta et al. |
| 2007/0118425 A1 | 5/2007 | Yruski |
| 2007/0130012 A1 | 6/2007 | Yruski |
| 2007/0130594 A1 | 6/2007 | Hidary et al. |
| 2007/0146812 A1 | 6/2007 | Lawton |
| 2007/0150919 A1 | 6/2007 | Morishita |
| 2007/0162945 A1 | 7/2007 | Mills |
| 2007/0168288 A1 | 7/2007 | Bozeman |

(56) References Cited

U.S. PATENT DOCUMENTS

| | | |
|---|---|---|
| 2007/0174471 A1 | 7/2007 | Van Rossum |
| 2007/0244760 A1 | 10/2007 | Bodnar et al. |
| 2007/0294740 A1 | 12/2007 | Drake et al. |
| 2007/0294773 A1 | 12/2007 | Hydrie et al. |
| 2007/0299935 A1 | 12/2007 | Plastina et al. |
| 2008/0046948 A1 | 2/2008 | Verosub |
| 2008/0097872 A1 | 4/2008 | Peckover |
| 2008/0102947 A1* | 5/2008 | Hays et al. ............... 463/31 |
| 2008/0104106 A1 | 5/2008 | Rosenberg et al. |
| 2008/0109844 A1 | 5/2008 | Baldeschwieler et al. |
| 2008/0120407 A1 | 5/2008 | Chen et al. |
| 2008/0127244 A1 | 5/2008 | Zhang |
| 2008/0140239 A1 | 6/2008 | Rosenberg et al. |
| 2008/0140717 A1 | 6/2008 | Rosenberg et al. |
| 2008/0141372 A1 | 6/2008 | Massey et al. |
| 2008/0207137 A1 | 8/2008 | Maharajh et al. |
| 2009/0083788 A1 | 3/2009 | Russell |
| 2009/0183081 A1* | 7/2009 | Rodriguez et al. ............ 715/733 |
| 2009/0204481 A1 | 8/2009 | Navar |
| 2009/0254430 A1* | 10/2009 | Cherenson ................. 705/14.12 |
| 2010/0022310 A1 | 1/2010 | van Datta |
| 2010/0030640 A1 | 2/2010 | van Datta |
| 2010/0043022 A1 | 2/2010 | Kaftan |
| 2010/0169910 A1 | 7/2010 | Collins et al. |
| 2010/0269138 A1 | 10/2010 | Krikorian et al. |
| 2011/0004669 A1 | 1/2011 | Navar |
| 2011/0010545 A1 | 1/2011 | Kill et al. |
| 2011/0015975 A1 | 1/2011 | Yruski et al. |
| 2011/0029383 A1 | 2/2011 | Engel et al. |
| 2011/0125582 A1 | 5/2011 | Datta |
| 2011/0138058 A1 | 6/2011 | Ishida |
| 2011/0307339 A1 | 12/2011 | Russell |
| 2013/0232000 A1 | 9/2013 | van Datta |
| 2013/0232001 A1 | 9/2013 | van Datta |
| 2013/0297411 A1 | 11/2013 | van Datta |
| 2014/0019229 A1 | 1/2014 | van Datta |
| 2014/0019249 A1 | 1/2014 | Nicholas et al. |
| 2014/0089081 A1 | 3/2014 | Yruski |
| 2014/0215224 A1 | 7/2014 | Navar |
| 2014/0304328 A1 | 10/2014 | Capati |
| 2014/0324576 A1 | 10/2014 | van Datta |
| 2014/0337882 A1 | 11/2014 | Navar |

FOREIGN PATENT DOCUMENTS

| | | |
|---|---|---|
| EP | 0 405 776 A2 | 1/1991 |
| EP | 0 620 688 A2 | 10/1994 |
| EP | 0 625 760 | 11/1994 |
| EP | 0 743 595 | 10/1996 |
| EP | 0 905 928 | 3/1999 |
| GB | 2 141 907 A | 1/1985 |
| GB | 2 194 369 A | 3/1988 |
| JP | 12-20925 | 9/1989 |
| JP | 6335569 | 12/1994 |
| JP | 8117445 | 5/1996 |
| JP | 8173634 | 7/1996 |
| JP | 82-80934 | 10/1996 |
| JP | 2001111921 | 4/2001 |
| JP | 01321556 | 11/2001 |
| JP | 2002-259433 | 9/2002 |
| JP | 2002-358455 | 12/2002 |
| JP | 02366971 | 12/2002 |
| JP | 03248844 | 9/2003 |
| JP | 2004-102475 | 4/2004 |
| JP | 04298469 | 10/2004 |
| WO | WO 93/14462 A1 | 7/1993 |
| WO | WO 93/19427 A1 | 9/1993 |
| WO | WO 93/22017 A1 | 11/1993 |
| WO | WO 93/23125 | 11/1993 |
| WO | WO 95/12442 A1 | 5/1995 |
| WO | WO 95/12853 | 5/1995 |
| WO | WO 9851384 A1 * | 11/1998 ............... A63F 9/22 |
| WO | WO9959097 A1 | 11/1999 |
| WO | WO 03/032127 A2 | 4/2003 |
| WO | WO 2004/100010 | 11/2004 |
| WO | WO 2005/086969 A2 | 9/2005 |
| WO | WO 2007/041022 | 4/2007 |
| WO | WO 2007/041028 | 4/2007 |
| WO | WO 2007/130681 | 11/2007 |

OTHER PUBLICATIONS

U.S. Appl. No. 11/240,655, filed Sep. 30, 2005, van Datta, Targeted Advertising.
U.S. Appl. No. 11/241,229, filed Sep. 30, 2005, van Datta, Advertising Impression Determination.
Business Wire, "Juno launches America's first free Internet e-mail service; Initial advertisers include Land's End, Miramax and Snapple," Apr. 19, 1996.
Price Waterhouse Coopers, "IAB Online Ad Measurement Study," Dec. 2001.
Nielson Media Research, "What TV Ratings Really Mean," Jun. 2005.
"Statement in Accordance with the Notice from the European Patent Office dated Oct. 1, 2007 Concerning Business Methods" Nov. 1, 2007, XP002456252.
Extended European Search Report for EP 07776856.2 dated Jun. 9, 2011.
JP Notification Reasons for Refusal for JP Application No. 2009-509786 dated Jul. 28, 2011.
U.S. Appl. No. 12/190,323 Final Office Action mailed Nov. 14, 2011.
U.S. Appl. No. 12/370,531 Final Office Action mailed Nov. 16, 2011.
U.S. Appl. No. 12/571,225 Office Action mailed Feb. 2, 2012.
Andreaux. J.-P.; Copy Protection system for digital home networks; Mar. 2004; IEEE, vol. 21, Issue: 2; pp. 100-108.
Cohen, Josh, "A General Overview of Two New Technologies for Playing Protected Content on Portable or Networked Devices," Microsoft Windows Media, Jun. 2004, 1-8.
Courtois N et al: An Algebraic Masking Method to Protect AES Agaist Power Attacks, 'Online! XP002344150 Retrieved from the Internet: URL:eprint.iacr.org/2005/204.pdf> 'retrieved on Sep. 8, 2005!
Microsoft Corporation, "A Technical Overview of Windows Media DRM 10 for Devices," Microsoft Windows Media, Sep. 2004, 1-16.
Microsoft Corporation, "Architecture of Windows Media Rights Manager," www.microsoft.com/windows/windowsmedia/howto/articles/drmarchitecture.aspc, May 2004.
Recording Industry Association of America, "Frequently Asked Questions—Webcasting," www.riaa.com/issues/licensing/webcasting_faq.asp. (acc. 2004).
U.S. Copyright Office, "The Digital Millennium Copyright Act of 1998," Oct. 1998, 1-18.
PCT/US06/037018, International Search Report and Written Opinion mailed Aug. 7, 2007.
PCT/US06/036958, International Search Report and Written Opinion mailed Apr. 27, 2007.
PCT/US07/11059, International Search Report and Written Opinion mailed May 30, 2008.
EP 06815173.7, Extended European Search Report mailed Oct. 5, 2011.
JP 2009-509786, Decision of Refusal mailed Oct. 30, 2012.
JP 2009-509786, Decision of Refusal mailed Jul. 28, 2011.
CN 200780016268.2, First Office Action mailed Jan. 4, 2012.
U.S. Appl. No. 11/241,229 Final Office Action mailed Apr. 23, 2010.
U.S. Appl. No. 11/241,229 Office Action mailed Nov. 19, 2009.
U.S. Appl. No. 12/571,204 Office Action mailed Feb. 28, 2012.
U.S. Appl. No. 11/240,655 Office Action mailed Aug. 5, 2013.
U.S. Appl. No. 11/240,655 Final Office Action mailed Jan. 27, 2010.
U.S. Appl. No. 11/240,655 Office Action mailed Apr. 16, 2009.
U.S. Appl. No. 12/190,323 Final Office Action mailed Feb. 25, 2013.
U.S. Appl. No. 12/190,323 Office Action mailed May 7, 2012.
U.S. Appl. No. 12/190,323 Office Action mailed Jun. 8, 2011.
U.S. Appl. No. 13/191,398 Final Office Action mailed Jun. 7, 2013.
U.S. Appl. No. 13/191,398 Office Action mailed Mar. 22, 2012.
U.S. Appl. No. 11/535,370 Final Office Action mailed Jun. 8, 2010.
U.S. Appl. No. 11/535,307 Office Action mailed Dec. 10, 2009.
U.S. Appl. No. 11/535,307 Final Action mailed Sep. 8, 2009.

(56) References Cited

OTHER PUBLICATIONS

U.S. Appl. No. 11/535,307 Office Action mailed Apr. 16, 2009.
U.S. Appl. No. 13/013,789 Final Office Action mailed Feb. 27, 2013.
U.S. Appl. No. 13/013,789 Office Action mailed Oct. 9, 2012.
U.S. Appl. No. 11/586,990 Final Office Action mailed Apr. 10, 2013.
U.S. Appl. No. 11/586,990 Office Action mailed Nov. 23, 2012.
U.S. Appl. No. 11/586,990 Final Office Action mailed Feb. 14, 2011.
U.S. Appl. No. 11/586,990 Office Action mailed Sep. 15, 2010.
U.S. Appl. No. 11/588,036 Final Office Action mailed Oct. 4, 2012.
U.S. Appl. No. 11/588,036 Office Action mailed Apr. 27, 2012.
U.S. Appl. No. 11/588,036 Final Office Action mailed Feb. 17, 2011.
U.S. Appl. No. 11/588,036 Office Action mailed Sep. 14, 2010.
U.S. Appl. No. 11/586,958 Office Action mailed Mar. 18, 2011.
U.S. Appl. No. 11/586,958 Office Action mailed Sep. 1, 2010.
U.S. Appl. No. 11/586,958 Office Action mailed Dec. 11, 2009.
U.S. Appl. No. 11/586,989 Final Office Action mailed Dec. 9, 2010.
U.S. Appl. No. 11/586,989 Office Action mailed May 11, 2010.
U.S. Appl. No. 11/586,989 Office Action mailed Mar. 30, 2009.
U.S. Appl. No. 11/586,959 Final Office Action mailed Aug. 30, 2013.
U.S. Appl. No. 11/586,959 Office Action mailed May 8, 2013.
U.S. Appl. No. 11/586,959 Final Office Action mailed Oct. 5, 2012.
U.S. Appl. No. 11/586,959 Office Action mailed Apr. 27, 2012.
U.S. Appl. No. 11/586,959 Final Office Action mailed Feb. 14, 2011.
U.S. Appl. No. 11/586,959 Office Action mailed Oct. 1, 2010.
U.S. Appl. No. 12/370,531 Office Action mailed Aug. 1, 2013.
U.S. Appl. No. 12/370,531 Final Office Action mailed Aug. 3, 2011.
U.S. Appl. No. 12/370,531 Final Office Action mailed Aug. 1, 2011.
U.S. Appl. No. 12/370,531 Office Action mailed Feb. 2, 2011.
U.S. Appl. No. 11/588,236 Office Action mailed Sep. 9, 2009.
U.S. Appl. No. 11/588,236 Office Action mailed Mar. 5, 2009.
U.S. Appl. No. 12/703,188 Final Office Action mailed Oct. 12, 2012.
U.S. Appl. No. 12/703,188 Office Action mailed Apr. 6, 2012.
U.S. Appl. No. 10/924,009 Supplemental Final Office Action mailed Feb. 4, 2009.
U.S. Appl. No. 10/924,009 Final Office Action mailed Dec. 5, 2008.
U.S. Appl. No. 10/924,009 Office Action mailed Jun. 30, 2008.
U.S. Appl. No. 12/717,108 Final Office Action mailed Jan. 31, 2012.
U.S. Appl. No. 12/717,108 Final Office Action mailed Jul. 20, 2011.
U.S. Appl. No. 12/717,108 Office Action mailed Feb. 9, 2011.
U.S. Appl. No. 12/782,678 Final Office Action mailed Jul. 31, 2013.
U.S. Appl. No. 12/782,678 Office Action mailed Jan. 7, 2013.
U.S. Appl. No. 12/782,678 Office Action mailed Oct. 4, 2012.
U.S. Appl. No. 11/586,958 Final Office Action mailed Mar. 12, 2014.
Fontijn, Willem; AmbientDB: P2P Data Management Middleware for Ambient Intelliegence; Year: 2004; IEEE; pp: 1-5.
U.S. Appl. No. 13/939,178 Office Action mailed Oct. 10, 2013.
U.S. Appl. No. 11/240,655 Final Office Action mailed Nov. 14, 2013.
U.S. Appl. No. 13/191,398 Office Action mailed Dec. 3, 2013.
U.S. Appl. No. 14/028,327 Office Action mailed Nov. 7, 2013.
U.S. Appl. No. 11/586,990 Office Action mailed Nov. 20, 2013.
U.S. Appl. No. 11/586,958 Office Action mailed Nov. 6, 2013.
U.S. Appl. No. 11/586,958 Final Office Action mailed Feb. 14, 2011.
U.S. Appl. No. 11/586,958 Office Action mailed Sep. 30, 2010.
U.S. Appl. No. 12/703,188 Office Action mailed Nov. 21, 2013.
U.S. Appl. No. 11/586,990 Final Office Action mailed Apr. 7, 2014.
U.S. Appl. No. 13/013,789 Office Action mailed Dec. 20, 2013.
U.S. Appl. No. 11/588,036 Office Action mailed Jan. 6, 2014.
U.S. Appl. No. 14/242,664, filed Apr. 1, 2014, Murgesh Navar, Statutory License Restricted Digital Media Playback on Portable Devices.
U.S. Appl. No. 11/586,959 Office Action mailed Feb. 12, 2014.
U.S. Appl. No. 14/091,327, filed Nov. 26, 2013, Andrey Yruski, Asynchronous Advertising Placement Based on Metadata.
JP 2013-039681, Notification of Reason for Refusal mailed Feb. 12, 2014.
U.S. Appl. No. 13/191,398 Final Office Action mailed Jun. 10, 2014.
U.S. Appl. No. 14/028,327 Final Office Action mailed Jun. 9, 2014.
U.S. Appl. No. 11/588,036 Final Office Action mailed Apr. 15, 2014.
U.S. Appl. No. 13/013,789 Final Office Action mailed Jul. 28, 2014.
U.S. Appl. No. 11/586,959 Final Office Action mailed Jul. 31, 2014.
U.S. Appl. No. 12/703,188 Final Office Action mailed Jul. 14, 2014.
JP 2013-039681, Decision of Refusal dated Feb. 3, 2015.
U.S. Appl. No. 11/586,990 Final Office Action mailed Dec. 8, 2014.
U.S. Appl. No. 11/586,990 Office Action mailed Aug. 12, 2014.
U.S. Appl. No. 11/588,036 Office Action mailed Jan. 15, 2015.
U.S. Appl. No. 11/586,958 Office Action mailed Jan. 14, 2015.
U.S. Appl. No. 11/586,959 Final Office Action mailed Dec. 8, 2014.
U.S. Appl. No. 14/028,327 Office Action mailed Oct. 8, 2014.
U.S. Appl. No. 13/857,080 Office Action mailed Apr. 29, 2015.
U.S. Appl. No. 13/857,082 Office Action mailed Apr. 16, 2015.
U.S. Appl. No. 14/028,327 Final Office Action mailed Mar. 19, 2015.
U.S. Appl. No. 14/308,313 Office Action mailed Apr. 27, 2015.
U.S. Appl. No. 14/091,327 Office Action mailed Mar. 12, 2015.
U.S. Appl. No. 14/315,694 Office Action mailed Apr. 10, 2015.
U.S. Appl. No. 12/703,188 Office Action mailed Apr. 1, 2015.
U.S. Appl. No. 11/586,959 Office Action mailed Jul. 9, 2015.
U.S. Appl. No. 11/588,036 Final Office Action mailed Aug. 4, 2015.
U.S. Appl. No. 11/586,958 Final Office Action mailed Aug. 4, 2015.
US 8,689,348, 04/2014, Navar (withdrawn)

* cited by examiner

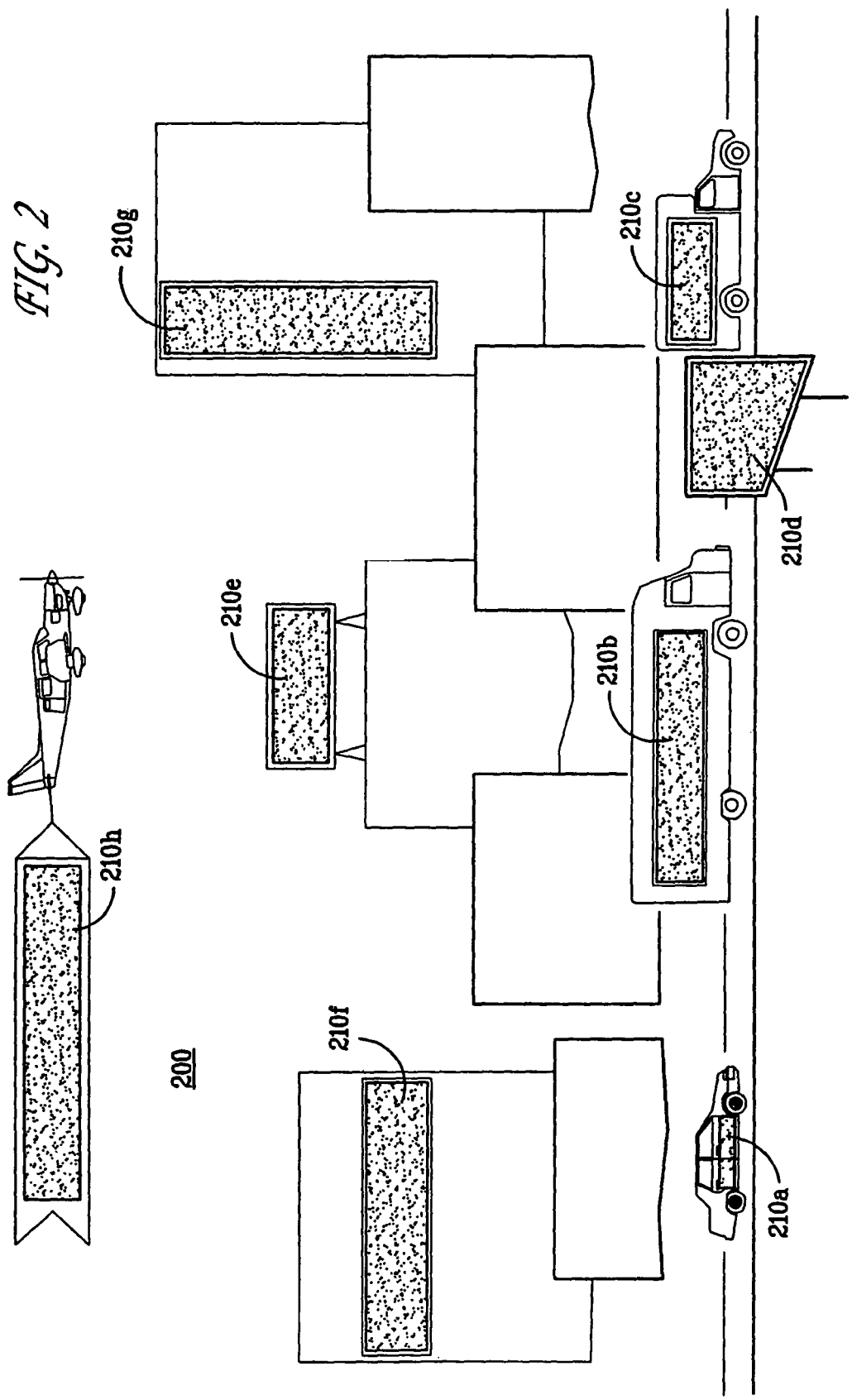

DISPLAY OF USER SELECTED ADVERTISING CONTENT IN A DIGITAL ENVIRONMENT

CROSS-REFERENCE TO RELATED APPLICATIONS

This application is a continuation-in-part and claims the priority benefit of U.S. patent application Ser. No. 11/241,229 filed Sep. 30, 2005 and entitled "Advertising Impression Determination," the disclosure of which is incorporated herein by reference.

This application is related to U.S. patent application Ser. No. 09/780,995 for an "In-Contents Advertising Method, In-Contents Advertising Server, and Program-Transferring Medium for Realizing In-Contents Advertising," the disclosure of which is incorporated herein by reference.

BACKGROUND OF THE INVENTION

1. Field of the Invention

This invention relates generally to advertisements in a digital medium. More specifically, this invention relates to placing advertisements for products, services and/or advertisers that may be of interest to a particular consumer in a digital medium, such as an interactive video game, based in part upon the consumer's preferences, and tracking the advertisements that are selected and how often those advertisements are viewed by the consumer.

2. Description of the Related Art

At one time, advertisements were limited to handbills and word-of-mouth. As new mediums for communication developed, so did opportunities and means for advertising. For example, with the advent of newspapers and magazines, advertisements soon began to fill the pages alongside the daily or weekly news.

Such advertising generally proved to be a benefit to all parties involved. Advertisers were able to tout their latest products or services (or those of their clientele); newspapers and magazines were able to offset the costs of printing through the sale of advertising space; and consumers were able to learn of new products of interest through their interaction with these various forms of media. This beneficial relationship amongst the advertiser, media, and consumer held true with regard to the arrival of radio and television.

Advertisers and media outlets are now, however, finding themselves challenged by the rise of digital media, especially with regard to video games and portable digital media devices. As the advertising power of older mediums decreases due to the rise of video games and portable digital media as forms of entertainment, advertising buys for product and service offerings are seen by less people as a whole and, demographically, less of the power-buying public. As such, there has become an increased effort to expand advertising to digital media.

Despite the ability to introduce advertising content into, for example, a video game environment, the user may often dislike an advertisement selected automatically or at random, or may wish to customize the environment or game. For example, in a racing game, a user might wish to customize his or her racecar with advertising content such as a name, logo, or other advertising for a particular product or service, as is done in real life, to enhance the appearance of the car. Similarly, in a sports game, a user might wish to display particular advertising content on the shirt or uniform of a game character or team, rather than leave the shirt or uniform blank, or displaying some default or random selection.

Many users have a genuine interest in a particular product or service, to the extent that they may wish to incorporate advertising content related to that product or service that they find appealing into their game or other digital environment. Similarly, advertisers spend considerable sums of money for the placement of advertising content in a particular game environment, and may be willing to pay more when they know that the user deems the content to be desirable. Accordingly, there is a need for users to be able to select those advertisements for products and/or services that are of interest to appear in a digital environment and to track those selections so that advertisers may know which content is considered more desirable by the users.

SUMMARY OF THE INVENTION

An embodiment of the present invention provides a method for placing an advertisement in a digital environment based upon a user's choice, subject to certain predetermined parameters. Through the method, a user is assigned a rating. A list of advertisements that correspond to that rating is displayed to the user, who may then select a desired advertisement from the list. The selected advertisement is then displayed in the digital environment. Reports may be generated based upon the advertisements selected and the number of selections and/or impressions (e.g., uses, interactions, or viewings) by the user, which may be reported to advertisers.

An exemplary system for implementing the aforementioned interaction-based advertising display method is also disclosed as is a software-medium for implementing the same.

BRIEF DESCRIPTION OF THE DRAWINGS

FIG. 2 illustrates an exemplary digital video game environment with a variety of 'tagged' objects for the insertion of advertising content.

DETAILED DESCRIPTION

Figure 1B:
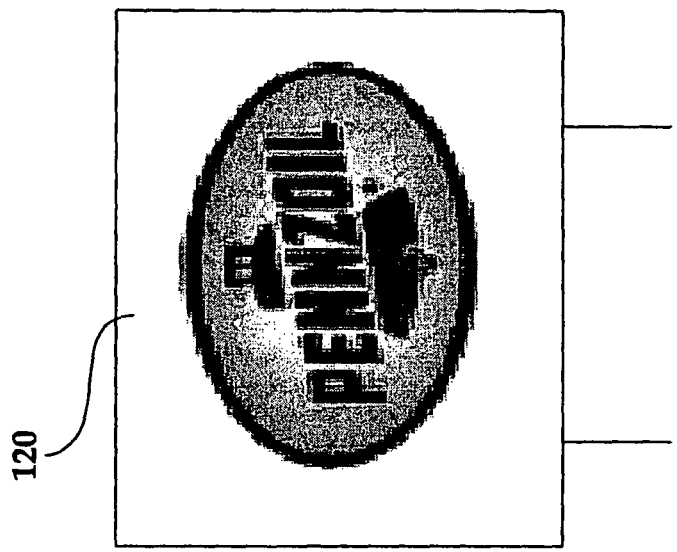
FIG. 1B illustrates a 'tagged' object wherein an advertisement has been 'inserted' into the 'tagged' area.
Figure 1A:
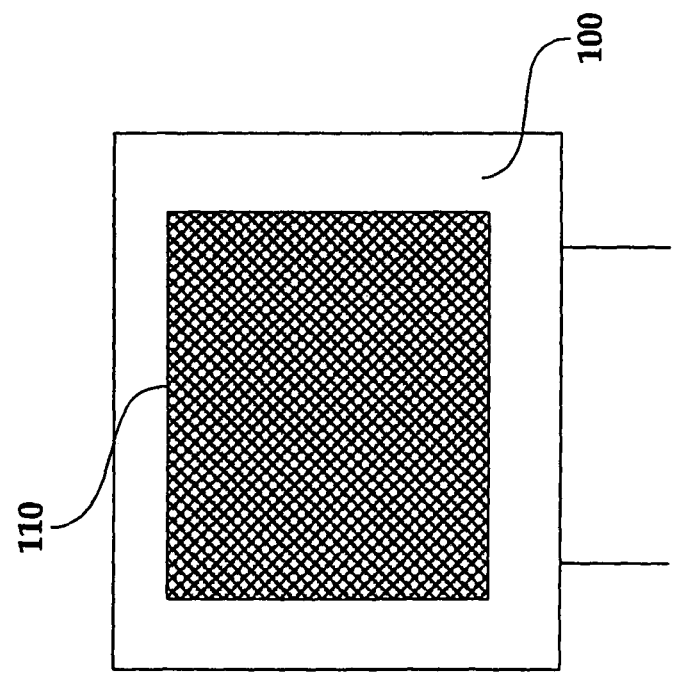
FIG. 1A illustrates a 'tagged' object in a digital environment such as a video game.

Certain objects in a digital medium such as a video game may be 'tagged,' these 'tagged' areas being subject to the insertion or placement of advertising content. For example, and as shown in FIG. 1A, the face of a billboard 100 may be 'tagged' (110) to indicate that an advertisement may be embedded in that location. In this way, an advertising system like that disclosed in U.S. patent application Ser. Nos. 09/780, 995 and 11/241,229 may, via an advertising client embodied in video game software or system hardware, identify various tagged areas 110 and provide advertising content that may be imposed through texturing or other graphic rendering techniques that make it appear as if the advertisement was designed specifically for the billboard as shown in FIG. 1B (120). Such dynamic advertising content may be pushed or pulled into the video game or other digital environment via, for example, an end-user client and/or advertising server.

Advertising content may also be loaded into digital media during development and subsequently 'unlocked' by a game player after purchase of the media. For example, a user may input a special code or obtain an 'Easter egg' in a game whereby specific advertisements embedded in the game are made available for association with one or more tagged advertising assets (e.g., tagged objects). Similar codes or 'Easter eggs' may be used to unlock special content delivered over a network, such as advertisements hosted by an advertisement server. The code may be a reward for performance in the game.

Various methodologies for 'inserting' content into a 'tagged' asset are known in the art. For example, U.S. Pat. No. 5,946,664 for an "Apparatus and Method for Executing a Game Program Having Advertisements Therein" discloses receiving, at predetermined times, advertising data that relates to at least one advertisement in a video game. The advertising data is then displayed in particular locales in the game environment in accordance with the particular game program. U.S. Pat. No. 6,539,544 for a "Game Machine System, Broadcasting System, Data Distribution System, and Method, Program Executing Apparatus and Method" discloses a system configured to distribute digital data in response to software start enable signals and identification signals. These signals may correspond to commercial advertisements for substitution or insertion into a portion of the data at the receiver side system. The disclosure of both U.S. Pat. No. 5,946,664 and U.S. Pat. No. 6,539,544 are incorporated herein by reference.

FIG. 2 illustrates an exemplary digital video game environment 200—a cityscape—with a variety of advertisements as may be implemented in an embodiment of the present invention. The cityscape game environment 200 may reflect any number of objects and structures as may be found in a city environment, for example: a number of buildings in addition to vehicles that travel throughout the general landscape (e.g., hills, mountains, etc.) via a series of roadways. Certain objects may also appear in the video game environment 200 surrounding the city, such as airplanes and the like.

While a cityscape is depicted in FIG. 2, any number of different video game environments may be utilized within the scope of the present invention. For example, the video game environment may be a race-track, which might reflect the racing surface and grandstands filled with spectators, and even the race cars. 'Pit-row' might run along side a particular portion of the race-track. Alternatively, the video game environment 200 may be a modern or medieval battlefield in addition to any number of natural environments (e.g., underwater, outer space, open fields, forests, mountains, etc.), or a sports game taking place in an arena or stadium. The present invention may be implemented in any video game environment 200. Regardless of the particular video game environment 200, game designers and engineers will attempt to make the environment as realistic as possible by including objects and structures that lend to realism of that particular environment.

In the case of the cityscape of FIG. 2, part of that realism may be attributed to various types of signage, specifically advertisements, trade names, and trademarks or corporate logos (collectively referred to as advertisements) that indicate the source or quality of certain goods and/or services. Various structures in the video game environment 200 of FIG. 2 exhibit numerous types of signage and advertisements 210.

For example, advertisement 210a is an advertisement as may be found on the side of a taxi-cab. The advertisement may be the taxi-cab company name and phone number or for a particular good or service in the region serviced by the taxi-cab (e.g., a night club). Similarly, advertisement 210b is an advertisement as may be found on the side of a bus, which may be for the local newspaper, a local radio show, or an upcoming movie. Likewise, advertisement 210c found on the side of, for example, an industrial vehicle may be for a particular shipping company (e.g., a moving company) or for the name of the company whose cargo is being shipped (e.g., a furniture company).

Advertisements may also be on billboards as in the case of advertisement 210d and advertisement 210e. Such billboards may be alongside a road (like advertisement 210d) or may be a top a building (like advertisement 210e). Any variety of good or services may be found on such billboards as is the case in the real world. Signage and related advertisements and indicia of sponsorship or ownership may also be found on the face of a building (like advertisement 210f), which could reflect the name of the company occupying the building or may also be a poster of some sort applied to the face of a building that may be permanent or temporary (like advertisement 210g).

Advertisements may be found in a variety of other mediums in the video game environment 200 such as skywriting, banners that follow behind an airplane (like advertisement 210f), or on the actual body of the airplane or a vehicle (e.g., painted on the body or frosted on the glass versus an affixed sign or placard). Advertisements may also be seen on any variety of posters and signs as may be found at bus stops or on televisions in an electronics store. Similarly, advertisements may be seen on handbills, flyers or other printed media in the video game environment 200. Additionally, certain advertising effects may be achieved through audio advertising over the radio or a loudspeaker or the spoken word of other characters in the video game environment 200 as is further discussed below.

Advertising 'tags' (as referenced in FIG. 1A) may reflect not only the space in a game environment 200 where advertising content may be 'inserted' but may also reflect information such as size limitations, coloring and shading requirements, pointers to variables that track state and impression data, functions and programs associated with the advertisement, hyperlinks, mini-games associated with the advertisement, user-profile filters and, in some embodiments, even advertising relevance. For example, various parties may impose and apply rules and metadata related to the 'tagging' of assets as well as the advertising content that is ultimately inserted into these assets. As a result of 'tagging' various advertisement areas, not only may relevant advertising content (i.e., targeted advertising based on a user profile) be delivered to a user but the generation of an available advertisement reference list may take place as is further described below.

Figure 3A:
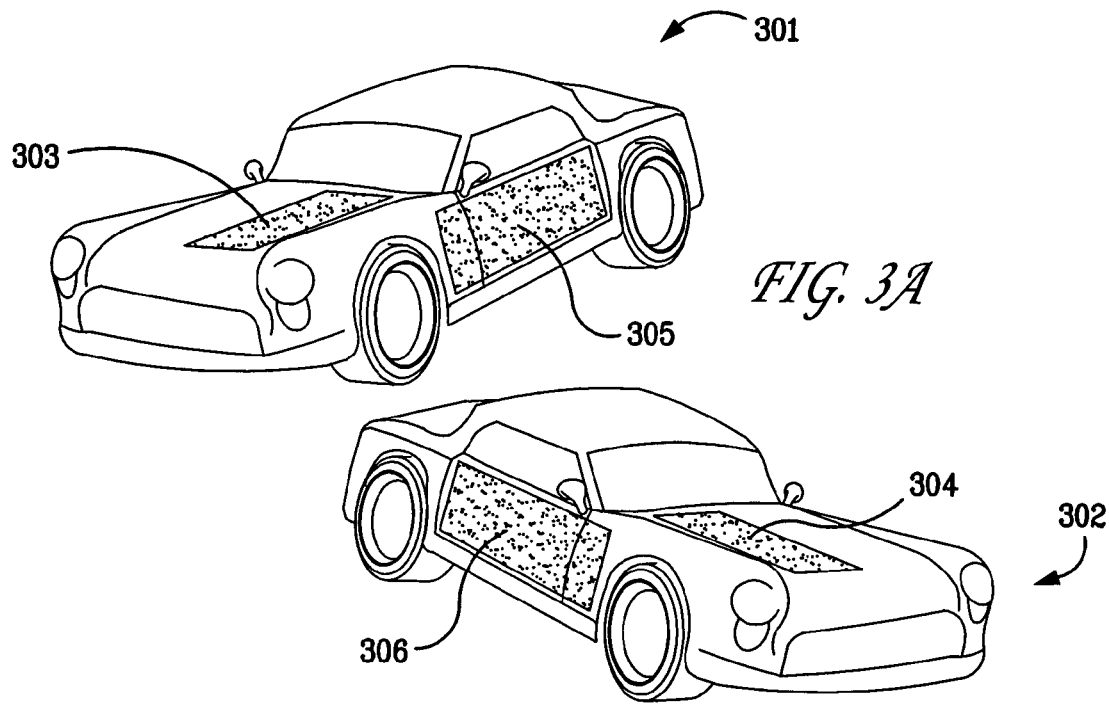
FIG. 3A illustrates an alternative object that may appear in an exemplary digital video game environment with a variety of 'tagged' objects for the insertion of advertising content.
Figure 3B:
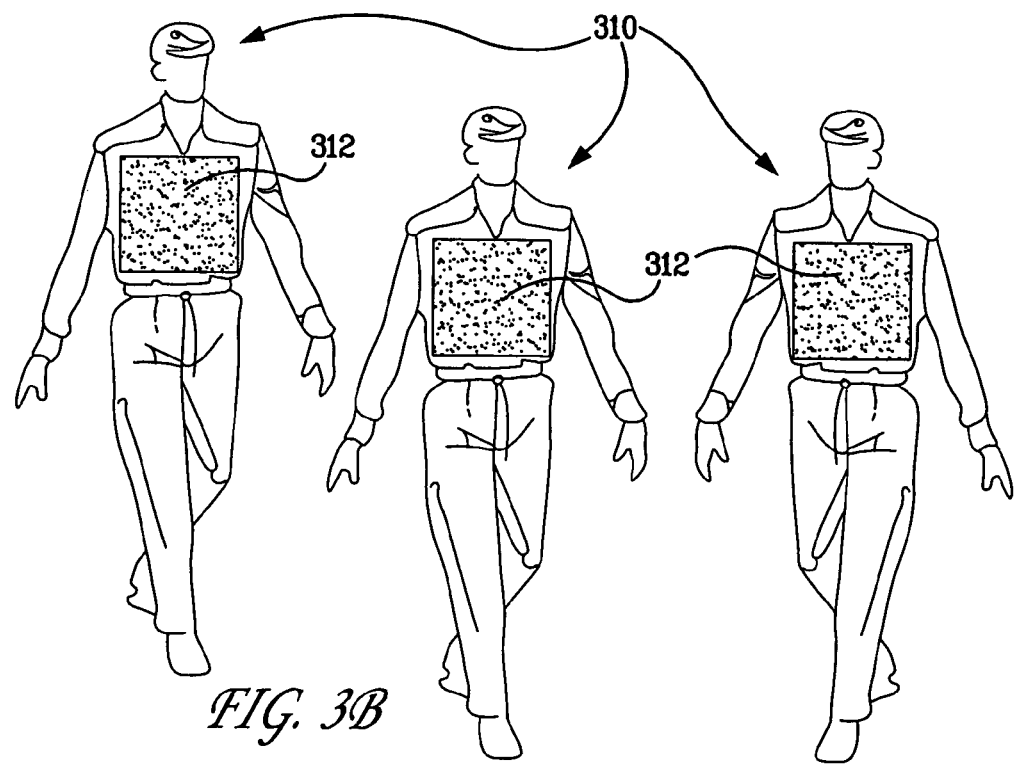
FIG. 3B illustrates an alternative object that may appear in an exemplary digital video game environment with a variety of 'tagged' objects for the insertion of advertising content.

Advertising 'tags' are not limited to non-moving 'print-like' advertisements (e.g., a billboard). Moving items such as cars or players may also contain advertising tags. For example, FIG. 3A shows race cars 301 and 302 having advertising tags 303 and 304 (respectively) on their hoods, and tags 305 and 306 (respectively) on their sides. FIG. 3B shows players 310 wearing uniforms or jerseys containing advertising tags 312. The 'tagging' of various other objects in a video game environment including non-traditional advertising objects is within the scope and spirit of the present disclosure.

Advertising 'tags' may also be associated with other visual formats such as audio and video. For example, a television in a video game may be 'tagged' as to reflect that the user tuning the television to a particular channel will cause a full motion video advertisement to be streamed. Various other advertisements may be streamed or rendered on additional channels subject to the whim of the game designer and the extent of 'tagging' of assets for advertisement introduction. Similar attributes may be reserved for providing real-time programming and the like (e.g., short films, movie previews and so forth).

Similarly, audio may be 'tagged' for advertising purposes. For example, if a user plays a video game with a radio (e.g., in an automobile), the game designer may create different stations whereby actual music from actual musical artists is played. That music may be interspersed with various advertisements as one might hear over the radio in the real-world. Similarly, the actual music a user listens to may be a dynamic play list as in the case of a real-world radio station instead of a one-time, static soundtrack. In that way, the user may play the game today or five years from now and be able to listen to not only relevant advertisement but relevant music that is current and popular as of the day the user plays the game.

In one embodiment of the present invention, a user is assigned a rating. This rating may be based on the user's performance in a video game as a whole (e.g., overall performance) or in part (e.g., with regard to specific objectives or missions). For example, a user may be awarded ratings points for winning races or games, completing combat missions, or accomplishing certain other tasks. The higher (or better) the user's performance in a particular game environment, the higher the user's rating.

The rating may be assigned by a variety of entities. For example, a particular video game may assign ratings points in the context of the game. A game character (in a military example) may start off as a private. That rank may be is associated with a particular rating or may in and of itself be the rating. The game character may (through excellence in combat, for example) be promoted (e.g., to corporal, to sergeant, to lieutenant, to captain, to major, to colonel, to general) or receive various awards and commendations (e.g., the Silver Star, the Purple Heart, and so forth). The ratings may also be assigned in a sports context. For example, in a baseball game, a game character may start off at a Single A minor league farm team. Again, that assignment may be associated with a particular rating or may be the rating itself. As the game character progresses through the game (e.g., through winning games, striking out opponents, and the like), the character may be promoted to the Double-AA farm team, to the Triple AAA farm team and eventually to the major leagues.

Various ratings may also comprise subsidiary ratings. For example, the military example, a character might be a second lieutenant or a first lieutenant. The character may also be a brigadier general (i.e., a one-star general), a major general (i.e., a two-star general), a lieutenant general (i.e., a three-star general), and so forth. Similarly, and in the baseball example, a pitcher may be a starting pitcher, a short- or long-relief pitcher, or a closer.

Each rating may have associated with it a list of advertising content that is available to the user if the user has achieved that particular rating. From this list of advertising content, the user may select particular advertising content for insertion in a digital environment. For example, the user may select particular content for application to a vehicle as in the case of FIG. 3A. The user may similarly select advertisements for display on a uniform as is the case in FIG. 3B.

The user may also be free to select advertising content associated with ratings below the user's particular rating but not from higher ratings. For example, the user may select a name, logo, picture, or other advertising element to insert in a particular advertising 'tag' from the available list based upon the user's preference. By doing so, the user may customize his race car, team, or character jersey, etc., in a way pleasing to the user while maintaining game realism and still offering an advertising benefit to advertisers or manufacturers and/or providers of goods and/or services.

In one embodiment of the present invention, a higher user rating may result in access to more desirable advertising content. For example, a user with a low rating may be limited to selecting advertising content for generic fictitious (or real-world) advertisers such as "Joe's Bail Bonds" or "Sam's Seafood" to place on a car in a racing game, on jerseys in a sports game, on billboards, or in other 'tagged' assets in a game environment like that described in FIG. 2. A user with a higher rating, however, may have access to advertising content from top-tier or more desirable advertising offerings such as Coca-Cola or Nike.

Any desired number of ratings (or sub-ratings) of a game player and/or levels (or sub-levels) of advertising content as they pertain to the aforementioned user ratings may be implemented within the scope of the present invention. Thus, the user may be encouraged to accomplish the goals of the particular game and obtain a higher rating in order to gain access to more desirable advertising content so that the user may customize the game and its environment to their particular liking.

In another embodiment of the present invention, the user may choose to interact with an advertisement for a product or service by means other than placing or selecting a logo, name or picture on an item or character. For example, a user may cause their game character to listen to a particular song on the radio or watch a particular movie or television program. Similarly, the user may cause their character to drive a particular automobile or to drink a particular beverage. The user may further cause their character to interact with certain items in the environment such as articles of clothing, fashion accessories, or any other good or service.

Interactions may include an information exchange, a communication, observation, detection of sound, and direct or indirect physical contact. For example, an interaction may constitute an exchange of information via a conversation. An interaction may also be represented by the receipt of information via observations. Alternatively, a character may interact directly with an object that has been 'tagged' with advertising. For example, a game character may pick up a soft drink sold by a particular soft drink manufacturer. In a further embodiment, a game character may hear a communication, for example, from a television or a radio broadcast or between other game characters. In yet another embodiment, a game character may indirectly come into contact with a product; for example by discharging a weapon at a vending machine or a billboard. The above described game interactions are exemplary; the scope of the present invention covers all types of interactions with an advertisement, product, or service.

Figure 4:
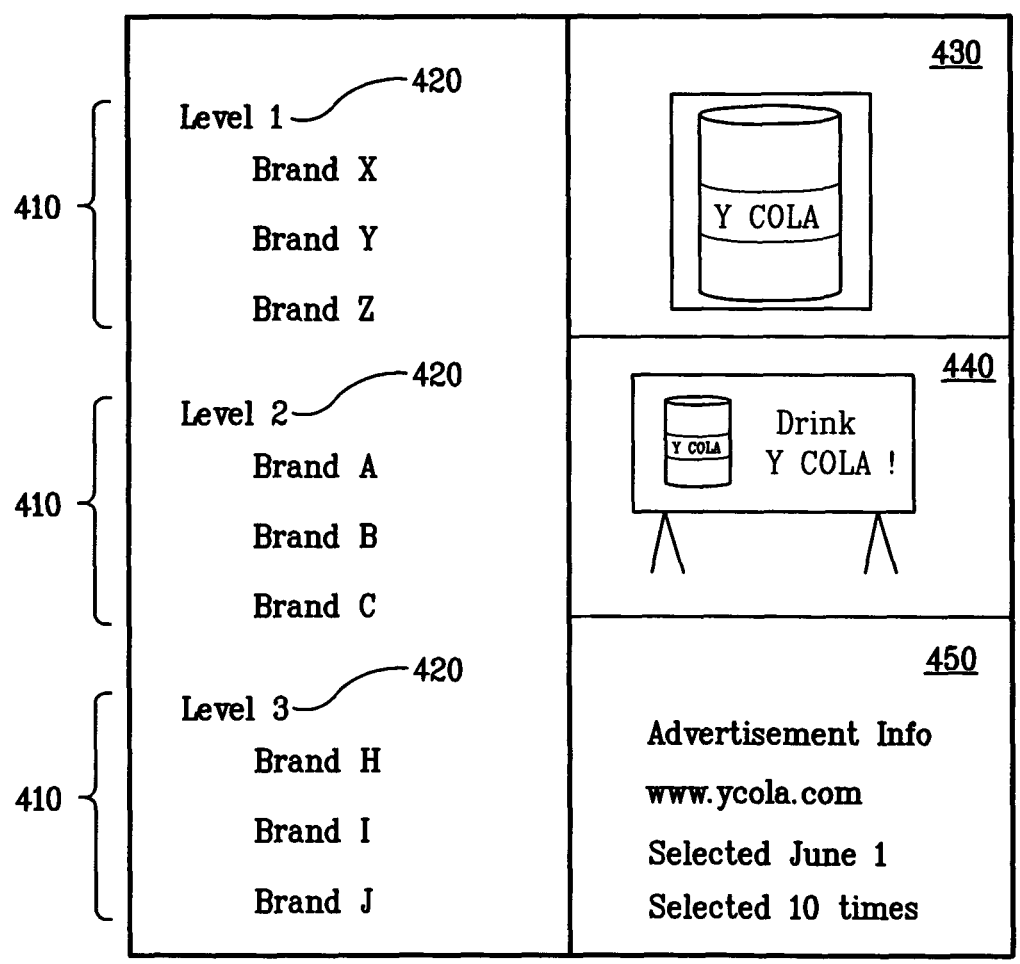
FIG. 4 illustrates an available advertisement reference list in accordance with one embodiment of the present invention.

FIG. 4 illustrates an available advertisement list 400 reflecting advertising content (or indicia of that content) that may (presently or in the future) be available for insertion into an game environment (like that disclosed in FIG. 2) with advertising 'tags' or other means for the display of advertising content. Items in the list (i.e., advertisement identifiers 410 reflecting different products/services or brand names) may be sorted into different groups, levels, or categories 420. Each of the groups 420 may be associated with a specific user rating. Which groups 420 (and the identifiers 410 therein) are associated with a particular rating may be determined in different ways. In one embodiment, the placement of an identifier 410 in a particular group may be subject to certain priorities as established through various advertisers 'buying in' to an advertisement network. That is, one advertiser may pay a premium fee for their product name (an identifier 410) to be listed in a particular group 420 associated with a higher user rating than other product names (identifiers 410) and thus harder to obtain in that a game player must exhibit exceptional skill to achieve access to that group 420 and the identifiers 410 therein. Even placement of a particular identifier 410 within the group 420 could command a different fee (e.g., which identifier 410 is listed first and which identifier 410 is listed last).

Thus, advertising content (identifier 410) in a group 420 corresponding to the highest rating will be seen and used by only those few players who are able to achieve that rating. This may create a "premium" effect in which the advertiser pays more to have its name and content considered as requiring more skill and perseverance to obtain and thus more "valuable" or desirable to a user in that it represents the user's ability to obtain it. On the other hand, default content, or content corresponding to low ratings, may be available to many more players and thus will be seen more often, but may not be considered by the players to be worthy of much attention.

Other methodologies may be used to list or sort the advertisement identifiers 410. Listings may be categorized by product sector or service sector, for example: food, movies, and music. Sub-categories may also be used, for example, with regard to food: fine-dining, exotic, fast food, etc. Any number of categorization and arrangement schemes may be implemented in available advertisement list 400 including, but not limited, to a rotating basis within a particular group 420 or among all the identifiers 410 as a whole (e.g., one product may be in a low group like Level 1 but rotated to a high group like Level 3 the following day). Alternatively, the advertiser may pay a fee each time its advertising content is displayed, with content in the higher categories commanding a higher price than content in the lower categories.

Available advertisement list 400 may also comprise an advertisement preview window 430 that may show the advertisement (or a portion thereof) as that advertisement will be imported to a particular game environment. In this way, a user may preview the particular advertisement that is associated with advertisement identifier 410 before that advertisement is selected for insertion into a game environment.

Available advertisement list 400 may also comprise an environment window 440 that shows a variety of advertising assets subject to the insertion of advertising (e.g., a billboard as shown in FIG. 2 or a race car as shown in FIG. 3A). The user may, in an embodiment of the present invention, drag-and-drop an advertisement (such as may be displayed in advertisement preview window 430) into the particular advertising asset displayed in the environment window 440. The environment window 440, after identifying the asset for advertisement insertion, may request user confirmation and then present the next asset available for insertion. In some embodiments of the present invention, a family or group of assets may be displayed in the environment window 440 such that a particular selected advertisement (or related group of advertisements) is dragged-and-dropped into a particular group of assets such that advertisement selection may be accelerated to allow the user to advance to actual game play in the newly populated advertisement environment.

For example, a particular shape of billboard as may be displayed in environment window 440 may be populated with a particular advertisement associated with an identifier 410 (e.g., a specific advertisement) or a group of advertisements associated with an identifier 410 (e.g., a broader advertisement campaign), or a general family of advertisements (e.g., fast food). A particular series of advertisement assets may also be displayed in the environment window 440—for example, a series of billboards on a particular street or a series of televisions in a particular electronics store. Further, various tagged assets in a digital environment (or a specific number of assets) may be purchased or leased by a particular company through an advertising network. User selection of a particular advertisement, advertisement campaign, or advertisement family may be applied across the random group of tagged assets currently leased or sold through the network.

Selection of advertisements may also be achieved in other means other than 'drag-and-drop.' For example, a user may simply point-and-click or highlight and select a particular identifier 410 or group 420 and the appropriate collection of advertisements will randomly be displayed in various 'tagged' assets. Similarly, a user may individually select advertisements as they pertain to individual assets but without using a 'drag-and-drop' method (e.g., point-and-click). In still further embodiments, advertisement insertion may be 100% random but limited as to the particular availability of advertisements as those advertisements pertain to a particular user rating.

Available advertisement list 400 may also comprise an advertisement information window 450 that may display additional information about a presently selected advertisement such as a website, a brief summary of the product, the last date the advertisement was selected, the number of times the advertisement was selected, a particular association of an advertisement with a particular user rating and so forth. Advertisement information window 450 may list information about the advertisement generated by the user (e.g., generated through a virtual keyboard or voice-recognition software via a USB-microphone) or as may be provided specifically by the advertiser through an advertisement network.

Available advertisement list 400 may list only those groups 420 and/or identifiers 410 available to a particular skill set or user rating. That is, as of yet unavailable or unachieved identifiers 410 and/or groups 420 may not be displayed. In other embodiments, unavailable identifiers 410 and/or groups 420 may be listed but 'grayed out' or otherwise identified as being presently unavailable as an option for advertisement insertion. Previews may or may not be displayed in the preview window 430 depending on the unavailability. For example, by previewing the available advertisement as a 'teaser,' a game player may be motivated to accomplish certain in-game tasks or objectives such that they may be rewarded by access to the advertisement. Advertisements associated with various identifiers 410 may also rotate or change on a regular basis (e.g., new content is pushed in by an advertising server or made accessible by a server).

In some embodiments of the present invention, the information displayed through available advertisement list 400 may be integrated or further associated with a advertisement reference as described in co-pending and commonly owned U.S. patent application No. 60/798,240 filed May 5, 2006 and entitled "Population Of An Advertisement Reference List," the disclosure of which is incorporated herein by reference.

The advertisement identifier 410 of the present invention may also comprise a hyperlink to additional information about the product or service. This hyperlink may be embedded in the identifier 410 or explicitly provided in the advertisement information window 450. For example, a user may select an identifier 410 (or associated link) from the available advertisement list 400 via a controller device, and the link may then cause the launching of a web browser or other interface tool such that more detailed data about the particular service or product may be provided. This link may, in some instances, lead directly to the product manufacturer or service provider's website as may occur over a network connection. Upon arrival, the user may then peruse the website or other data portal of the service/product and learn more about the appropriate service/product or make a purchase. Selecting a particular identifier 410 may also lead to a third-party site where similar or identical information about a product or service may be provided.

In some instances, the aforementioned third-party site may be a shopping portal such as Amazon.com. In these instances, the user may then begin a commercial transaction to purchase the product. In one embodiment, user data as may be stored on a memory card or otherwise accessible due to, for example, having logged onto the network. This user data may automatically be populated into an order form (e.g., name, billing address, etc.) in order to expedite the purchase. In other instances, the third-party site may be a consumer review type website or portal wherein information about a product or service as generated by actual users/purchasers of the particular service or product may be reviewed.

In other instances, selecting the identifier 410 may lead to the option for the manufacturer or an intermediary party to provide more information about the product or service via an alternate communications medium. For example, the user may request information via e-mail or direct mail. The user may further request informative brochures or videos or a call from a customer service representative. Such an exchange may further occur on-line via, for example, a VoIP exchange or a textual chat session.

While data may be accessed over a network (e.g., the Internet) or via various sites hosted by manufacturers, service providers or other third-parties, various data may also be retained and accessed locally. For example, if a particular software title on a CD-ROM is embedded with particular advertisements, additional information about products in those advertisements may also be embedded on the CD. Alternatively, the information may be located in a local storage medium, the data having been accessed over a network during a download or update procedure not necessarily related to the particular viewing of any given advertisement although such information may be obtained concurrently as well.

Figure 5:
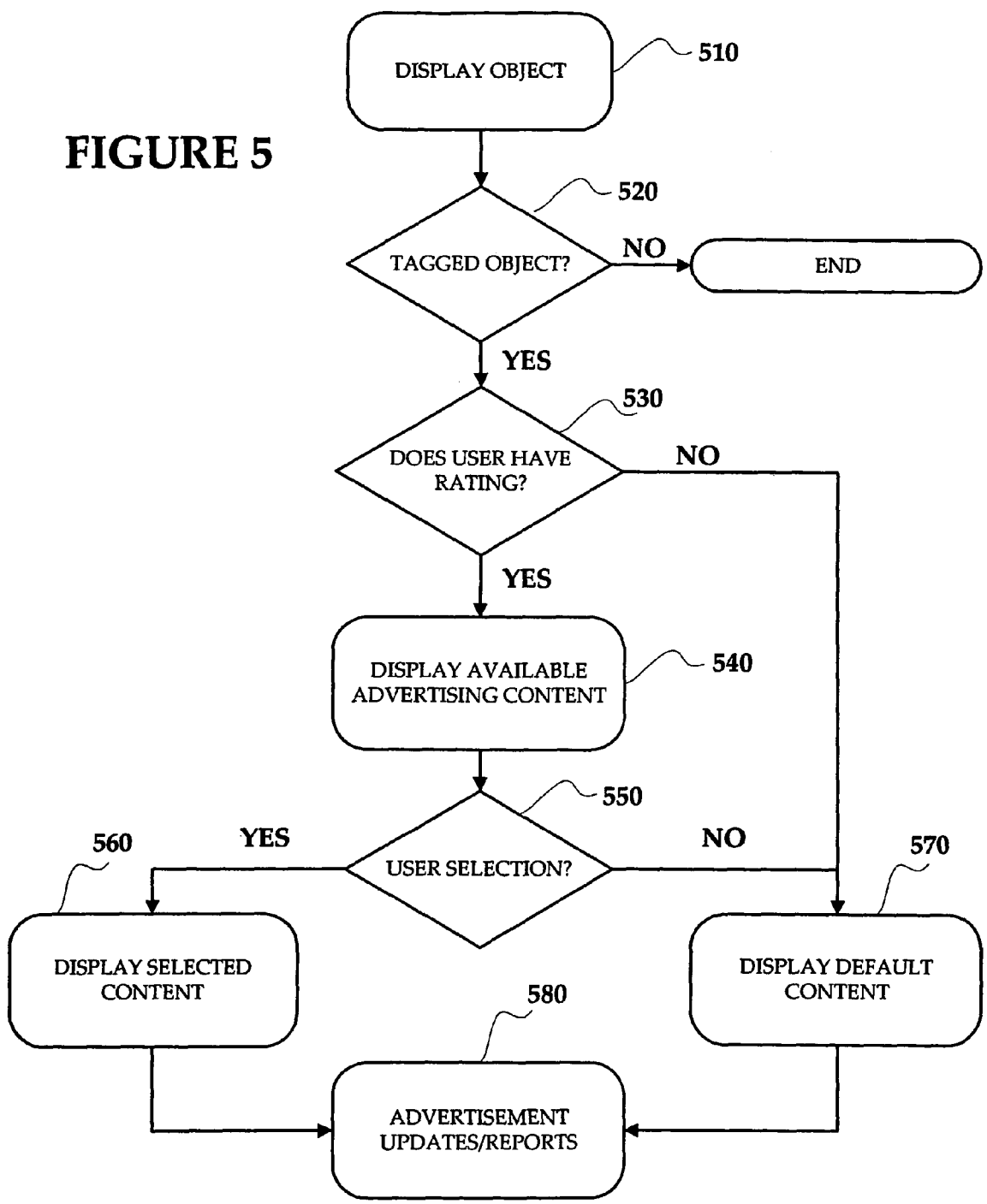
FIG. 5 illustrates an exemplary method for modifying an available advertisement reference list in accordance with one embodiment of the present invention.

FIG. 5 illustrates an exemplary method 500 for displaying a selected advertisement in response to a user request in accordance with one embodiment of the present invention. In step 510, an object is displayed in a digital environment, for example, on a billboard (100) like that described in FIG. 1A. In step 520, a determination is made as to whether that object comprises a 'tagged' area (e.g., area 110 in FIG. 1A) wherein certain advertisement data may be implemented, inserted, or otherwise displayed. If the object is not 'tagged' or otherwise capable of receiving dynamic advertising content, the method (at least with respect to the present object) terminates. It should be noted that this method may be executing simultaneously with respect to a number of objects capable of being rendered in a digital environment.

At step 530 it is determined whether the user has a rating, and, if so, the rating the user has obtained. For example, a user may not have a rating if it is the user's first time playing the game. If a user rating is found (as may be stored in, for example, main memory 625 or memory accessible by control engine 615 as both are described in FIG. 6), a list of the advertising content associated with that rating is displayed at step 540. This display may comport with the available advertisement list discussed in the context of FIG. 4 or another exemplary interface offering for advertisement selection and implementation. If there is no user rating assigned to the user, default content (e.g., a fake advertisement) may be displayed for that particular object as in step 570. Alternatively, the default may be that no content is displayed at all.

In step 550, a determination is made as to whether the user has selected desired advertising content from the available advertisement list 400. If it is determined that the user has selected desired content, the selected content is displayed on the tagged area (110) as in FIG. 1B (120) in step 560 when that asset is rendered in the environment (e.g., during the course of game play). If no selection has been made, default content (or no content) may be displayed as in step 570.

In some embodiments, the selection of an advertisement identifier 410 in the aforementioned available advertisement list 400 for insertion into a digital environment may be reported in step 580 to the advertiser. For example, a counter indicating the number of times the content has been displayed may be incremented, where the content was displayed or the time and/or length of the display may be noted, etc. Certain updates as they pertain to the user (e.g., user notes concerning an advertisement as may be displayed in information window 450) may also be updated.

As above, in some embodiments, a premium fee may be charged to particular advertisers in that the association of their content (via advertisement identifier 410) with a particular category 420 on available advertisement list 400 provides a somewhat more exclusive contact with the user. In these cases, the modification of an advertisement identifier 410 on a reference list may provide for the imposition of a fee charged to the advertiser because of the benefit of the advertisement having been seen. In that regard, various pricing structures may be implemented in the present invention with regard to the ease of viewing/interacting with an advertisement (e.g., particular settings with regard to an advertisement impression area), the number of times an advertisement appears, placement, availability of ancillary data on an available advertisement list 410, limitations as to linking, purchases, third-party comments, and so forth.

It should be noted that the available advertisement list 400 may be used in contexts other than video games, especially digital cinema and DVDs. For example, certain objects in a digital movie may be identified as tagged assets and advertisers or viewers alike may cause the population or modification of those 'tagged' assets in the digital environment.

Various embodiments and/or additional steps not shown may be used with the described method. For example, the list of available advertisement content may be displayed in a variety of ways. This display may be integrated into the digital environment, or may be a separate screen or a pop-up window that appears in the environment. The user may expressly call-up the available advertisement list 400 through any variety of controller commands. Similarly, the available advertisement list 400 may be displayed at a variety of times, for example, during game scene loading, at the end of a game level, or at the end of a game. Other means for causing the display of the available advertisement list 400 may be used, possibly including a timer (i.e., the list appears every 'x' minutes), or in response to certain conditions in the gaming environment such as the player not being engaged in combat or traveling at less than a particular speed, both situations that would indicate diverted attention may be possible. The available advertisement list 400 may also be displayed anytime a user 'pauses' game play or some other media utilizing the reference list (e.g., a DVD). User preference may also be used to determine when the available advertisement list 400 is displayed. This flexibility may allow users to change the appearance of a car, uniform or other elements of the gaming environment at their discretion, so that the user's enjoyment of the game is enhanced.

Figure 6:
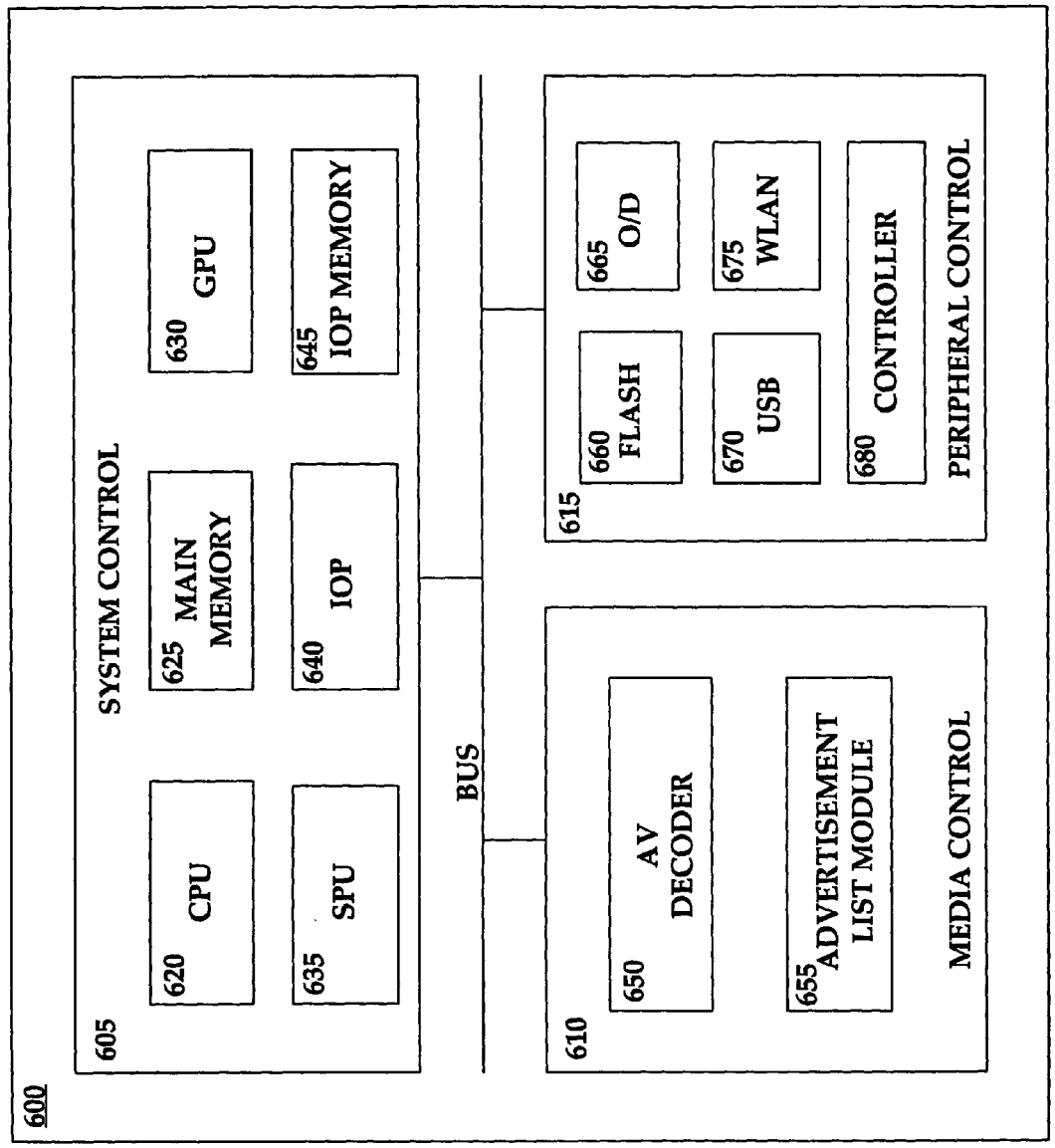
FIG. 6 illustrates an exemplary system for modifying an available advertisement reference list in accordance with an embodiment of the present invention.

FIG. 6 illustrates an exemplary system 600 for providing advertisement content in accordance with an embodiment of the present invention. The system 600 of FIG. 6 may be implemented in any number of client devices including but not limited to a portable media device or cellular phone, a home entertainment system such as a video game console, and any variety of online gaming devices including desktop and laptop computers.

The exemplary system 600 comprises system control 605, media control 610, and peripheral control 615. System control 605 is responsible for fundamental system operations (e.g., start-up, graphic rendering, input/output control, and so forth). Media control 610 is responsible for handling various audio and video formats including advertisements. Peripheral control 615 is responsible for the interface of various peripherals with the device.

Various combinations of hardware, software, and computer-executable instructions (e.g., program modules and engines) may be utilized with regard to system control 605, media control 610, and peripheral control 615. Program modules and engines include routines, programs, objects, components, data structures, and the like that perform particular tasks or implement particular abstract data types. Computer-executable instructions and associated data structures represent examples of the programming means for executing steps of the methods and implementing particular system configurations disclosed herein.

System control 605 may comprise a central processing unit (CPU) 620, main memory 625, a graphics processing unit (GPU) 630, sound processing unit (SPU) 635, input/output processor (IOP) 640, and IOP memory 645. The various controls (605, 610, and 615) and the various components therein (e.g., CPU 620 and main memory 625) may be communicatively coupled via a series of buses both dedicated and shared.

CPU 620 may utilize a dual-core 32-bit MIPS architecture although various other processor architectures may be utilized, including those disclosed in U.S. patent publication number 2002-0138637 for "Computer Architecture and Software Cells for Broadband Networks," the disclosure of which is incorporated herein by reference. CPU 620 executes programs stored in an operating system read only memory (OS ROM) (not shown) and main memory 625. Main memory 625 may contain pre-stored programs and may also contain programs transferred via IOP 640 from any variety of interfaces controlled by peripheral control 615 (e.g., from an optical disk via optical disk controller interface 665). IOP 640 controls various exchanges between CPU 620 and GPU 630 as well as media control 610 and the aforementioned peripheral control 615. GPU 630 executes drawing instructions from the CPU 620 and/or media control 610 to produce images for display on the client device. SPU 635 executes instructions and processes data to produce sound signals that are output on an audio device (not shown) that is coupled to or otherwise integrated with device 630.

Media control 610 is responsible for handling various audio and video formats as may be introduced to a client device. An AV decoder 650 and advertisement list module 655 are disclosed in the present exemplary embodiment. Media control 610 may further comprise enhanced dynamic random access memory (not shown) and a virtual machine environment (VME) (also not shown) for implementing certain emulation environments to isolate a particular media application from the actual hardware architecture of the device (e.g., an execution 'sandbox').

Through media control 610, a client device may be able to display still images, audio, and video as may be introduced through a variety of peripherals under the control of peripheral control 615 and working in conjunction with CPU 620 and GPU 630. In an exemplary embodiment of the present invention, media control 610 implements various audio formats such as MP3, ATRAC3, WMA, WAV, MP4, and AAC. Media control 610 also implements a variety of video formats including MPEG-4 Part 2 as well as H.264/AVC. Still images may also be implemented through media control 610 in formats such as JPEG, GIF, BMP, TIF, and PNG.

AV decoder 650 decompresses and/or decodes a variety of media as may be introduced by peripheral control 615. Decompressed media may be temporarily stored in eDRAM (not shown) prior to its subsequent rendering and/or audible emission by the device.

Peripheral control 615 controls any variety of peripheral input/outputs that may be present on the client device. For example, the client device may utilize flash memory as may be introduced through flash memory interface 660. Optical disc interface 665 provides for the introduction of data through any variety of optical discs such as CD-ROM or DVD-ROM but may also include proprietary formats such as the Universal Media Disc from Sony Corporation. Peripheral control 615 may further include a USB 2.0 interface 670, which may further include a mini-B interface. The client device may also comprise a WLAN interface 675 such that device can exchange data with other computing devices utilizing an 802.11x wireless protocol.

Other data input formats are well within the scope of the present invention, including an InfraRed interface conforming to IRDA standards or a Memory Stick™ interface, the Memory Stick™ being an IC-based recording medium from Sony Corporation. The client device may also comprise an IEEE 1394 ('FireWire') connection in addition to Bluetooth and Ultra Wideband (UWB) radio technology interfaces. Certain embodiments of the present invention may utilize a network adaptor, which may offer an Ethernet connection and/or telephony connection.

Peripheral control 615 also comprises controller interface 680 that allows for the introduction of instructions through a control device, for example, a joystick, directional buttons, and other control buttons. Various other control input methodologies may be used such as a USB-camera like the Eye Toy® from Sony Computer Entertainment Inc. It should be noted that, in some instances, a control device (e.g., the aforementioned USB-camera) may sometimes be introduced to the device through an additional peripheral input such as USB interface 670.

From metadata in a tagged region (110) or an actual advertisement (120) inserted into a tagged region or a set of data associated therewith, advertisement list module 655 may identify certain information about the advertisement (120) such that necessary information may be imported into or from the available advertisement list 400. This metadata may include the name of the advertiser, the nature of the product being advertised, a particular display format for the advertisement identifier 410 to be rendered in the available advertisement list 400, a hyperlink to be established between the advertisement identifier 410 and any additional information sources (e.g., a website). The advertisement list module 655

(via metadata or other associated data) may further identify any ancillary advertisement data such as logos, other graphics, applets, and the like. Advertisement list module 655 may further control associations between advertisements and ratings or facilitate associations between such information as may be independently generated by a particular video game as it relates to particular advertisement content selections (or groups thereof).

The advertisement list module 655 manages the acquisition of this additional information from the appropriate resource. For example, an advertisement that is to be inserted may be accompanied by a file constituting various ancillary data. The ancillary data may be stored in a memory buffer or other memory means (e.g., flash memory) and accessed as needed. This information may, alternatively, be embedded on a CD-ROM that is being read by the client device. Similarly, the advertisement list module 655 may need to access a communications network in order to pull the needed data from a remote server or other memory store or to receive a push transmission of the same.

Advertisement list module 655 may operate in conjunction with the various rendering hardware and software of the system 600 such as AV decoder 650, GPU 630, CPU 620, and SPU 635 to display the advertisement list 400, the advertisement identifiers 410 on that list, and any ancillary advertisement data 420. Advertisement list module 655 may further interact with WLAN interface 675 or some other network interface (not shown) in order to establish a network connection to obtain certain ancillary data or to other a link to another source of data once an advertisement identifier 410 is selected by a user from the advertisement list 400.

Advertisement list module 655 may further operate with the advertisement client (not shown) in order to determine whether there has been some interaction with an advertisement that would warrant the modification of the advertisement reference identifier 410 to the available advertisement list 400. The advertisement client may be embodied locally on the system 600 or through software being accessed by the system 600. In some embodiments of the present invention, the advertisement client may actually be embedded in the advertisement metadata of a tag or advertisement such to impose particular specifications with regard to advertisements. The advertisement client may also be a part of module 655 as has been previously noted.

Advertisement list module 655 may operate to communicate with an external server (not shown) to retrieve new advertisement data such that the available advertisement list 400 is updated and contains current advertisements, rather than advertisement data for, e.g., old or discontinued products and/or brands. Such updating may also include a reorganization of the groups 420 if advertisers have determined that they wish to move their advertisements to higher or lower groups.

Advertisement list module 655 may further operate to report certain interactions with an advertisement to an advertiser (e.g., feedback data). For example, an available advertisement list 400 may be generated but a user may never actually select an identifier 410 on that list 400. While selecting an identifier 410 may automatically provide an indicator to the advertiser or product manufacturer that an impression has been made by virtue of the user being redirected to a particular website (e.g., the redirection of the user may be accompanied by data concerning the cause and source of the redirection), merely populating the available advertisement list 400 may not. In these instances, advertisement list module 655 may generate data concerning the addition of the identifier 410 to the list 400 as the result of an interaction and/or impression and report that data to a particular advertiser, instructions for which may be embedded in a particular tag or advertisement inserted into the tag.

While the present invention has been described with reference to exemplary embodiments, it will be understood by those skilled in the art that various changes may be made and equivalents may be substituted for elements thereof without departing from the true spirit and scope of the present invention. In addition, modifications may be made without departing from the essential teachings of the present invention. Various alternative systems may be utilized to implement the various methodologies described herein and various methods may be used to achieve certain results from the aforementioned systems.

What is claimed is:

1. A method for displaying an advertisement in a digital environment based on a selection by a user, the method comprising:
   maintaining information regarding a plurality of advertisements in memory, wherein each advertisement is associated with a shopping portal and a minimum user rating level specified by an associated advertiser as being allowed to access the advertisement;
   maintaining information regarding a plurality of user ratings in memory, wherein each user rating is ordered from highest to lowest;
   maintaining a list of advertisements available to the user in memory, the user having a first user rating, wherein the maintained list of advertisements available to the user includes:
      advertisements associated with the first user rating, and
      advertisements associated with the user ratings lower than the first user rating,
   wherein the lower ratings are associated with lower advertising costs;
   executing instructions stored in a computer-readable storage medium, wherein execution of the instructions by a processor:
      determines that the user has earned a second user rating that is higher than the first user rating, wherein the second user rating is based on at least performance of a task by the user in the digital environment; and
      updates the maintained list of advertisements available to the user in memory, wherein the updated list of advertisements available to the user includes:
         advertisements associated with the second user rating, and
         advertisements associated with user ratings lower than the second user rating, wherein the lower ratings are associated with lower advertising costs, and wherein the advertisements associated with the user ratings lower than the second user rating include the advertisements associated with the first user rating;
   displaying at a client device the updated list of advertisements available to the user, wherein:
      the advertisements are displayed as respective advertisement identifiers in the updated list, wherein each advertisement identifier includes a link to the shopping portal for the respective advertisement,
      each advertisement and the corresponding advertisement identifier are associated with a respective user rating of the plurality of user ratings,
      the advertisement identifiers are arranged in the display based on the associated user ratings,
      the advertisement identifiers are displayed in a group list associated with the respective user rating, and placement as a first advertisement identifier in a group list is associated with a higher advertising cost within the respective group list;

receiving selection input from the user, the selection input corresponding to a selection of one of the advertisements on the updated list; and displaying the selected advertisement in the digital environment at the client device.

2. The method of claim 1, further comprising receiving a second input from the user indicating a location in the digital environment where the selected advertisement is to be displayed, and wherein displaying the advertisement further comprises displaying the advertisement in the indicated location.

3. The method of claim 1, wherein the performance of the task by the user includes achieving one or more objectives of the task in a gaming environment.

4. The method of claim 1, further comprising adding the selected advertisement to a list of advertisements that have been displayed in the digital environment.

5. The method of claim 4, wherein the list of displayed advertisements includes an indication of a number of times each advertisement is selected by the user for display in the digital environment, the list being reported to an advertiser.

6. The method of claim 4, wherein the list of displayed advertisements includes an indication of a number of times each advertisement is displayed in the digital environment, the list being reported to an advertiser.

7. The method of claim 1, further comprising displaying a default advertisement when the user has no user rating or has made no selection of advertisements.

8. The method of claim 7, wherein generating a list of displayed advertisements includes indicating which of the displayed advertisements were selected by default.

9. The method of claim 1, wherein displaying the selected advertisement includes designating the selected advertisement for interaction in the digital environment.

10. The method of claim 1, wherein the digital environment is a video game.

11. The method of claim 1, further comprising providing additional information about a product or service associated with a selected advertisement in another communications medium.

12. The method of claim 1, further comprising:
displaying an advertisement preview window, wherein the advertisement preview window provides a preview of an advertisement of the updated list of advertisements available to the user, the preview showing the advertisement in the context of the digital environment.

13. The method of claim 12, further comprising:
displaying an environment window, wherein the environment window provides a plurality of advertising assets onto which an advertisement may be placed in the digital environment; and
wherein the received selection input is a drag-and-drop, the drag-and-drop corresponding to a selection of the advertisement from the advertisement preview window and a placement of the selected advertisement onto one of the plurality of advertising assets from the environment window.

14. A system for displaying an advertisement in a digital environment based on a selection by a user, the system comprising:
an advertisement source including advertising content maintained in a computer-readable storage medium;
a memory configured to maintain:
information regarding a plurality of user ratings in memory, wherein each user rating is ordered from highest to lowest,
information regarding a plurality of advertisements in memory, wherein each advertisement is associated with a shopping portal and a minimum user rating level specified by an associated advertiser as being allowed to access the advertisement, and
a list of advertisements available to the user from the maintained advertising content, the user having a first user rating, wherein the maintained list of advertisements available to the user includes:
advertisements associated with the first user rating, and
advertisements associated with user ratings lower than the first user rating, wherein the lower ratings are associated with lower advertising costs; and
a computing device configured to:
determine that the user has earned a second user rating that is higher than the first user rather, wherein the second user rating is based on at least performance of a task by the user in the digital environment;
update the maintained list of advertisements available to the user in memory, wherein the updated list of advertisements available to the user includes:
advertisements associated with the second user rating, and
advertisements associated with user ratings lower than the second user rating, wherein the lower ratings are associated with lower advertising costs, and wherein the advertisements associated with the user ratings lower than the second user rating include the advertisements associated with the first user rating;
display at a client device the updated list of advertisements from the advertisement source available to the user, wherein:
the advertisements are displayed as respective advertisement identifiers in the updated list, wherein each advertisement identifier includes a link to the shopping portal for the respective advertisement,
each advertisement and the corresponding advertisement identifier are associated with a respective user rating of the plurality of user ratings,
the advertisement identifiers are arranged in the display based on the associated user ratings,
the advertisement identifiers are displayed in a group list associated with the respective user rating, and
placement as a first advertisement identifier in a group list is associated with a higher advertising cost within the respective group list;
receive a selection signal from the user indicating which advertisement from the updated list of advertisements to display; and
render the advertisement in the digital environment.

15. The system of claim 14, wherein the list of advertisements displayed to the user is further linked to an additional information source, the additional information source associated with the advertisement.

16. The system of claim 14, wherein the digital environment is a video game.

17. The system of claim 14, wherein the computing device is further configured to:
receive a second input from the user indicating a location in the digital environment where the selected advertisement is to be displayed; and
render the selected advertisement in the indicated location.

18. The system of claim 14, wherein the computing device is further configured to add the selected advertisement to a list of advertisements that have been displayed in the digital environment.

19. The system of claim 18, wherein the list of displayed advertisements is reported to an advertiser.

20. The system of claim 14, wherein the computing device is further configured to display a default advertisement when the user has no user rating or no selection signal is received corresponding to selection of advertising content.

21. A non-transitory machine-readable medium comprising instructions executable by machine, the instructions corresponding to a method for displaying an advertisement in a digital environment based on a selection by a user, the method comprising:

maintaining information regarding a plurality of advertisements in memory, wherein each advertisement is associated with a shopping portal and a minimum user rating level specified by an associated advertiser as being allowed to access the advertisement;

maintaining information regarding a plurality of user ratings in memory, wherein each user rating is ordered from highest to lowest;

maintaining a list of advertisements available to the user, the user having a first user rating, wherein the maintained list of advertisements available to the user includes:

advertisements associated with the first user rating, and advertisements associated with user ratings lower than the first user rating, wherein the lower ratings are associated with lower advertising costs;

determining that the user has earned a second user rating that is higher than the first user rating, wherein the second user rating is based on at least performance of a task by the user in the digital environment;

updating the maintained list of advertisements available to the user in memory, wherein the updated list of advertisements available to the user includes:

advertisements associated with the second user rating, and advertisements associated with user ratings lower than the second user rating, wherein the lower ratings are associated with lower advertising costs, and wherein the advertisements associated with the user rating lower than the second user rating include the advertisements associated with the first user rating;

displaying at a client device the updated list of advertisements available to the user, wherein:

the advertisements are displayed as respective advertisement identifiers in the updated list, wherein each advertisement identifier includes a link to the shopping portal for the respective advertisement, each advertisement and the corresponding advertisement identifier are associated with a respective user rating of the plurality of user ratings, the advertisement identifiers are arranged in the display based on the associated user ratings, the advertisement identifiers are displayed in a group list associated with the respective user rating, and placement as a first advertisement identifier in a group list is associated with a higher advertising cost within the respective group list;

receiving selection input from the user, the selection input corresponding to a selection of one of the advertisements on the updated list; and displaying the selected advertisement in the digital environment at the client device.

* * * * *